US012723413B2

(12) United States Patent
Cloutier

(10) Patent No.: US 12,723,413 B2
(45) Date of Patent: Sep. 1, 2026

(54) CONTAINER WITH INTERCHANGEABLE LINER

(71) Applicant: 2446914 ONTARIO INC., Vars (CA)

(72) Inventor: Alexandre Cloutier, Cumberland (CA)

(*) Notice: Subject to any disclaimer, the term of this patent is extended or adjusted under 35 U.S.C. 154(b) by 0 days.

(21) Appl. No.: 18/640,548

(22) Filed: Apr. 19, 2024

(65) Prior Publication Data

US 2024/0263463 A1 Aug. 8, 2024

Related U.S. Application Data

(63) Continuation of application No. 18/119,904, filed on Mar. 10, 2023, now Pat. No. 12,601,189, and a continuation of application No. 16/540,839, filed on Aug. 14, 2019, now Pat. No. 11,624,195.

(51) Int. Cl.

| | |
|---|---|
| ***B65D 25/16*** | (2006.01) |
| ***B21D 5/00*** | (2006.01) |
| ***B21D 5/02*** | (2006.01) |
| ***B28C 5/18*** | (2006.01) |
| ***B28C 5/20*** | (2006.01) |
| ***B65D 8/00*** | (2006.01) |
| ***B65F 1/06*** | (2006.01) |
| ***E04F 21/02*** | (2006.01) |
| ***E04F 21/16*** | (2006.01) |
| *E04G 21/02* | (2006.01) |
| *E04G 21/20* | (2006.01) |

(52) U.S. Cl.

CPC ............ *E04F 21/161* (2013.01); *B21D 5/002* (2013.01); *B21D 5/02* (2013.01); *B28C 5/18* (2013.01); *B28C 5/2063* (2013.01); *B65D 11/02* (2013.01); *B65D 25/16* (2013.01); *B65F 1/068* (2013.01); *E04F 21/026* (2013.01); *E04F 21/16* (2013.01); *B65F 2210/1815* (2013.01); *E04F 21/02* (2013.01); *E04G 21/025* (2013.01); *E04G 21/201* (2013.01)

(58) Field of Classification Search

CPC ................ E04G 21/201; E04G 21/025; B65F 2210/178; B65F 1/1452; B65F 1/068; B65F 2210/1815; B65D 25/16; B21D 5/002; B28C 5/18

USPC ........................... 220/23.89, 914, 23.87, 760

See application file for complete search history.

(56) References Cited

U.S. PATENT DOCUMENTS

| | | | | |
|---|---|---|---|---|
| 3,113,761 A * | 12/1963 | Platzaman | B08B 3/12 | 366/115 |
| 3,882,628 A * | 5/1975 | Stouder | A01K 97/04 | D7/603 |
| 3,971,360 A * | 7/1976 | Spoeth, Jr. | A47G 23/04 | D7/603 |
| 5,526,954 A * | 6/1996 | Georgiadis | B29C 45/4407 | 220/756 |

(Continued)

*Primary Examiner* — Stephen J Castellano

(74) *Attorney, Agent, or Firm* — Andrews Robichaud PC; Alessandro Colonnier

(57) ABSTRACT

The present disclosure provides for a container having an interchangeable liner. The container is comprised of a bottom portion having an aperture to receive the interchangeable liner as well as securing protrusions and stabilizing members. The securing protrusions serve to cooperate with the aperture to lock the liner within the container, whereas the stabilizing members serve to stabilize the container when a substance within the container is being mixed.

5 Claims, 55 Drawing Sheets

(56) References Cited

U.S. PATENT DOCUMENTS

| | | | | |
|---|---|---|---|---|
| 5,816,439 | A * | 10/1998 | Lovell | B65D 25/32 220/761 |
| 2005/0230400 | A1 * | 10/2005 | Robinson | B65F 1/068 220/629 |

* cited by examiner

10

20

10

200

210

30

10

500

500

1015

CONTAINER WITH INTERCHANGEABLE LINER

CROSS-REFERENCE TO RELATED APPLICATION

The present application for patent is a continuation of U.S. patent application Ser. No. 18/119,904 entitled "ADJUSTABLE STOPPER ASSEMBLY FOR PRESS BRAKE" filed Mar. 10, 2023, the entire disclosure of which is hereby expressly incorporated by reference herein.

FIELD

The invention relates to the field of mechanical accessories, and more specifically to adjustable stoppers to facilitate and improve sheet metal shaping in press brakes.

BACKGROUND

The use of container in the field of construction is commonplace since containers are required for mixing various materials such as cement, grout, paint, etc. Typically, a container is used for a certain purpose and discarded afterwards since cleaning the container can be tedious and time consuming. The discarded container is still useable if the container was cleaned but requires a lot of water and such cleaning is not necessarily environmentally friendly.

There is a need for a container which can be easily disassembled and cleaned for a subsequent use. The use of the modular container of the present disclosure in conjunction with a lining allows to re-use the container for an unlimited number of times unless the container breaks. In another embodiment of the present disclosure, a container which has no modular sections has securing apertures and protrusions allowing to lock an interchangeable liner in a container.

Trowels are commonly used as a hand tool to apply finishes to different surfaces in all sorts of industries. Typically, they come in many different sizes and shapes, but each trowel has its own specific application for its own specific task, which is generally on flat surfaces. Sometimes, when the surface that requires to be finished is curved, a traditional trowel will be cut or shaped for that specific shape, which is time consuming and will be of a single time use.

Conventional trowels often limit the possibilities and shapes of the surfaces on which they can be used. Therefore, there is a need for a new trowel to address these deficiencies. Specifically, there is a need for a new adjustable trowel that can quickly adapt the shape of the blade to the piece or surface being worked on and allow possibilities for new shapes of surfaces to be created. Such a trowel would consist of a blade, which finishes the surface, a handle, which the operator uses to hold and guide the trowel and a few adjustments that may have a body going through them to allow for different longitudinal adjustments at different points of the flexible blade in relation to the solid handle. The shape of the flexible blade would be adjusted by unlocking the adjustments, setting that section of the blade to the appropriate shape and then mechanically locked into place to keep such shape. The mechanical adjustment could be a locking sliding pin, a threaded knob, a pivoting locking snap or any other means of locking a longitudinal piece to different settings also known in the industry. The solid handle would be used to transfer the mechanical adjustment to the flexible blade to achieve the desired shapes and can be readjusted many times.

Portable press brakes are commonly used everyday by specialized contractors to finish different aspects of exterior finishes on all types of buildings and structures. The portable brake industry has been the same for many years with limited accessories that can be offered either with the brake or as an "add-on" or "retrofit" to improve the efficiency, accuracy and productivity of the conventional portable brake, especially when it comes to the measuring of the material being shaped. The lack of accessories means that many unnecessary steps need to be completed to achieve a result that could be otherwise realised in a timelier manner.

One accessory that offers those added benefits is an adjustable and reversible stopper assembly to limit the depth of the throat of the brake for repetitive measurements. Although some brakes come with existing stoppers from the manufacturer, they can only be used at a pre-set location or distance along the length of the brake. These existing stoppers are also limited as to the depth they can restrain the material from fitting in the throat of the brake, as they interfere with the top of the press brake extrusion. These existing accessories also use thumb screws that are screwed in directly to the press brake, which interferes with the aluminum piece holding the stopper and over time create bumps, marks or indentations on the bar. This ends up making the accessories hard to slide along the member and adjust them precisely.

Therefore, there is a need for a new adjustable stopper to overcome the above-mentioned deficiencies. Indeed, there is a need for a stopper assembly that can be retrofitted to existing and new brakes, and that can also be relocated easily to adapt to the length of material being bent along the full length of the brake.

SUMMARY

In an aspect, the present disclosure provides an adjustable stopper assembly for use in a press brake comprising: an upper frame to connect to a front portion of the press brake; an adjustable L-bracket pivotally connected to the upper frame to support the upper frame; an adjustable connector portion secured to the adjustable L-bracket and releasably secured to a rear portion of the press brake; and, a stopping member releasably secured to the upper frame to stop a layer of sheet metal positioned in the press brake.

In another aspect, the present disclosure provides a container having an interchangeable liner comprising: a bottom portion having at least one securing aperture for receiving the interchangeable liner; at least one securing protrusion on the liner for placement within the at least one securing aperture to lock the interchangeable liner within the container; and at least one stabilizing member positioned on the outer wall of the bottom portion for stabilizing the container when a substance is mixed within the container, wherein the removal of the interchangeable liner is facilitated through the interaction of the at least one securing aperture and the at least one securing protrusion, and wherein the securing aperture prevents the interchangeable liner from moving within the container.

In yet another aspect, the present disclosure provides an adjustable trowel comprising: a blade member to manipulate a material; at least two rods secured to the blade member to apply force onto the blade member; a handle connected to the at least two rods to move the blade member, the handle further comprised of at least two cavities; and, at least two locking members releasably secured to the at least two rods, the at least two locking members allowing the at least two rods to move vertically through the at least two locking members to adjust a shape and curvature of the blade member.

BRIEF DESCRIPTION OF THE DRAWINGS

The embodiments of the present disclosure will now be described by reference to the following figures, in which identical reference numerals in different figures indicate identical elements and in which.

The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present disclosure.

DETAILED DESCRIPTION

The terms "coupled", "connected" and "interconnected", along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, or that the two or more elements co-operate or interact with each other (e.g. as in a cause and effect relationship).

Figure 1:
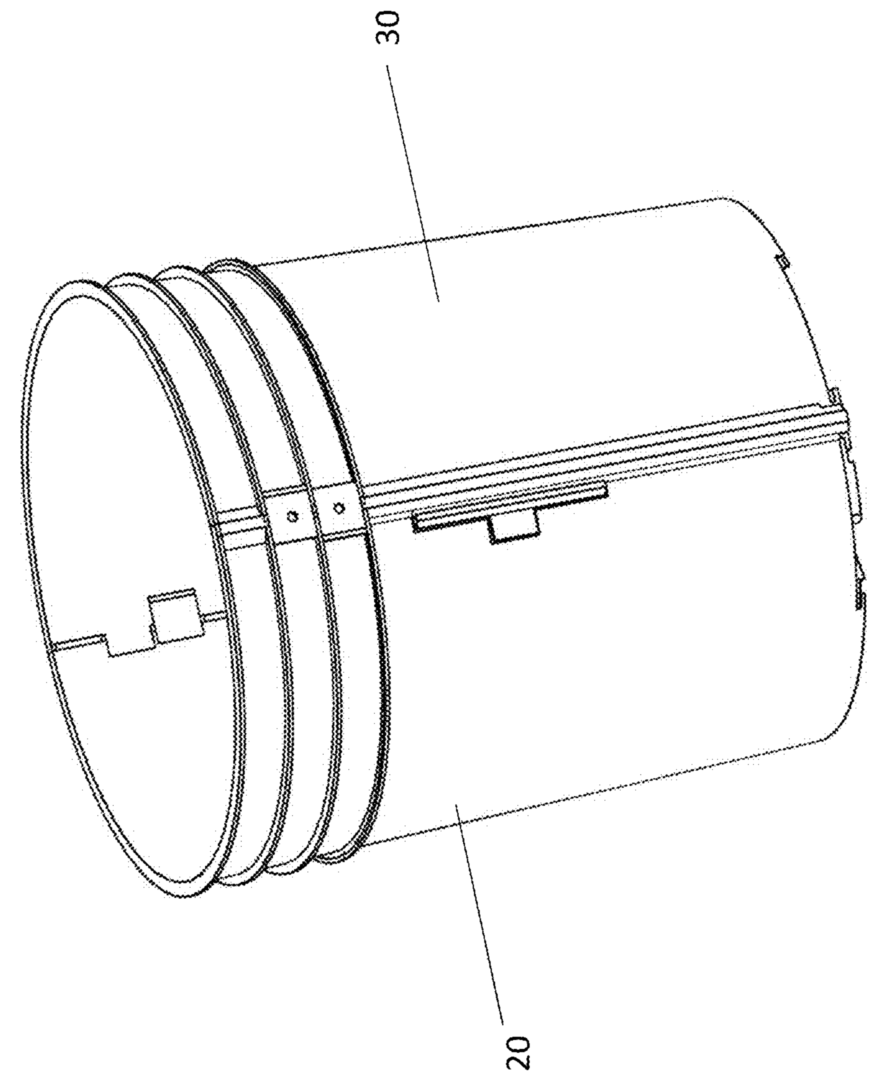
FIG. 1 is a perspective view of a modular container according to one embodiment of the present disclosure.

With reference to FIG. 1 and according to one embodiment of the present disclosure, a modular container 10 is shown. The modular container 10 has two interlocking container modules 20 and 30 which form container 10. The interlocking container modules 20 and 30 are locked into one another through interconnecting members which will be further described below. The size of the container has no limitation since the interlocking modules can be varied in dimensions allowing different containers to be created through the use of the modules of the present disclosure.

Figure 2:
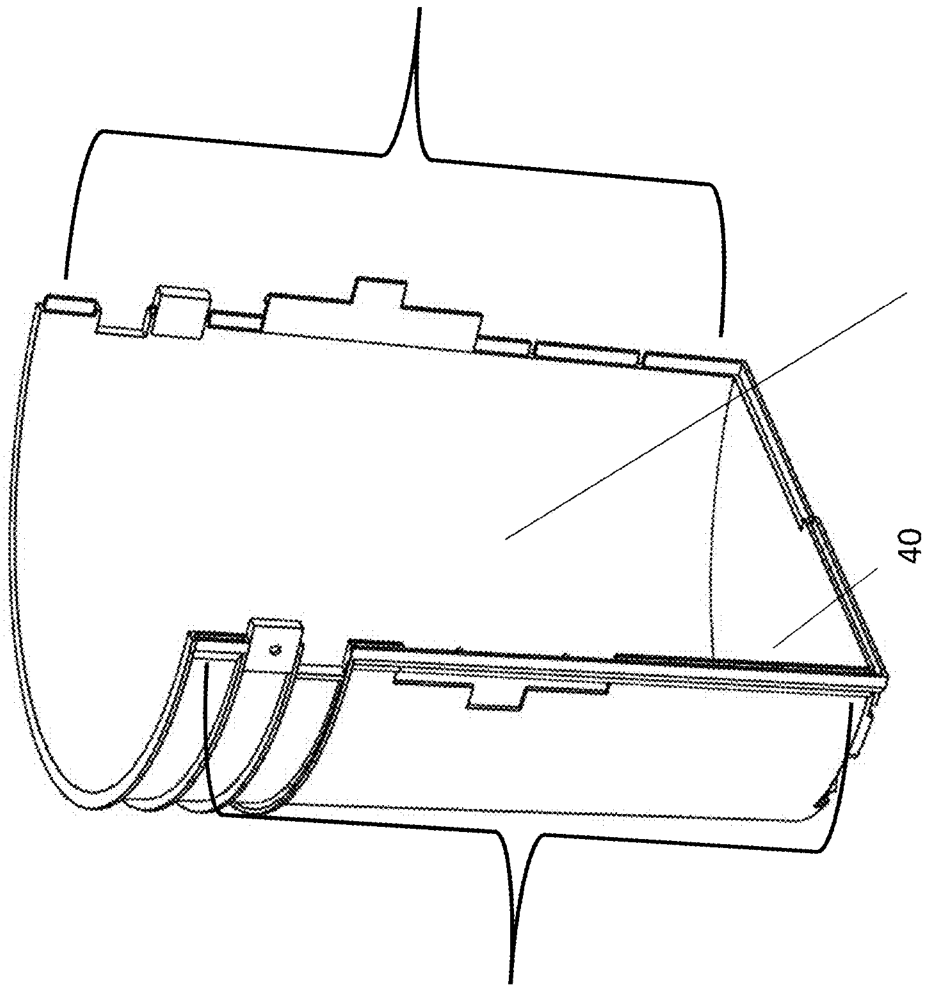
FIG. 2 is a perspective view of an interlocking container module according to one embodiment of the present disclosure.

With reference to FIG. 2 and according to one embodiment of the present disclosure, an interlocking container module 20 is shown. The interlocking container module 20 has a bottom surface 40 which provides a support for module 20. Module 20 also has a perimeter wall 50 which extends away from bottom surface 40 which semi-encloses a space above bottom surface 40. Perimeter wall 50 represents the outside wall of a container when a container is formed under the present disclosure when two modules are interlocked to form a container as shown in FIG. 1. Interlocking container module 20 has a first end 60 and a second end 70 positioned on the edges of perimeter wall 50.

Figure 3:
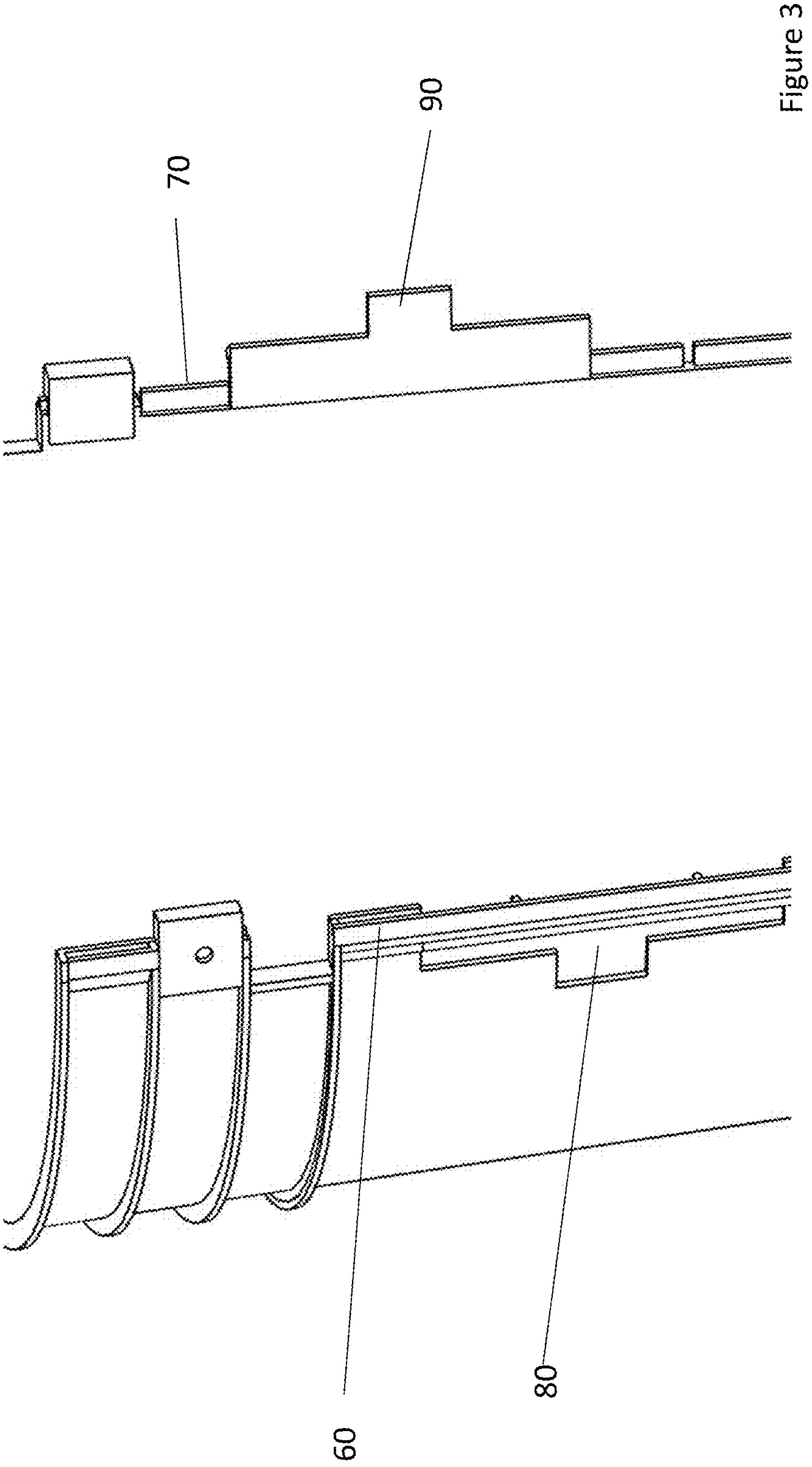
FIG. 3 is a perspective view of the first and second end of an interlocking container module according to one embodiment of the present disclosure.

With reference to FIG. 3 and according to one embodiment of the present disclosure, a first interconnecting member 80 is located on first end 60 in the form of an aperture. A second interconnecting member 90 is located on second end 70 in the form of a protrusion which is designed to be fitted within an aperture as present in interlocking member 80. The present interlocking container module with first and second interlocking members 80 and 90 allow to interlock an identical module to form a container as shown in FIG. 1.

Figure 4:
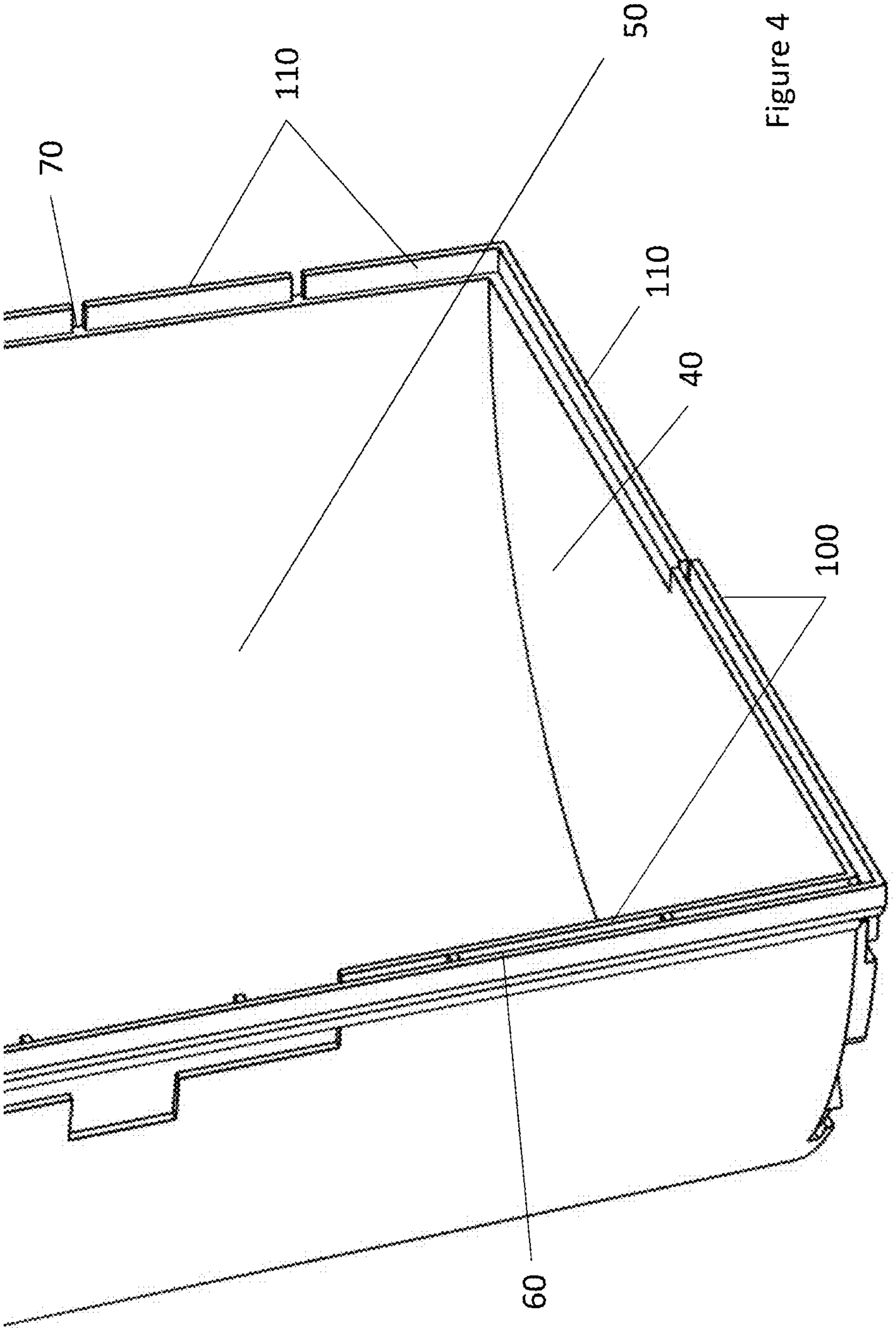
FIG. 4 is a bottom perspective view of guiding teeth and receiving slots positioned on an interlocking container module according to one embodiment of the present disclosure.

With reference to FIG. 4 and according to one embodiment of the present disclosure, receiving slots 100 are shown for receiving guiding teeth 110 when a forming a container made from interlocking two interlocking container modules of the present disclosure. A worker skilled in the relevant art would be familiar with the requirements to allow the receiving slots 100 and guiding teeth 110 to mate with one another when forming a container from interlocking two interlocking container modules of the present disclosure. The receiving slots 100 are positioned on the first end 60 of perimeter wall 50 and guiding teeth 110 are positioned on second end 70. Guiding teeth 110 and receiving slots 100 can also be extended onto bottom surface 40 allowing the bottom surfaces of two container modules to mate with one another to form a container according to the present disclosure. Guiding teeth 110 and receiving slots 100 also provide added vertical support once the guiding teeth 110 are positioned within receiving slots 100.

Figure 5:
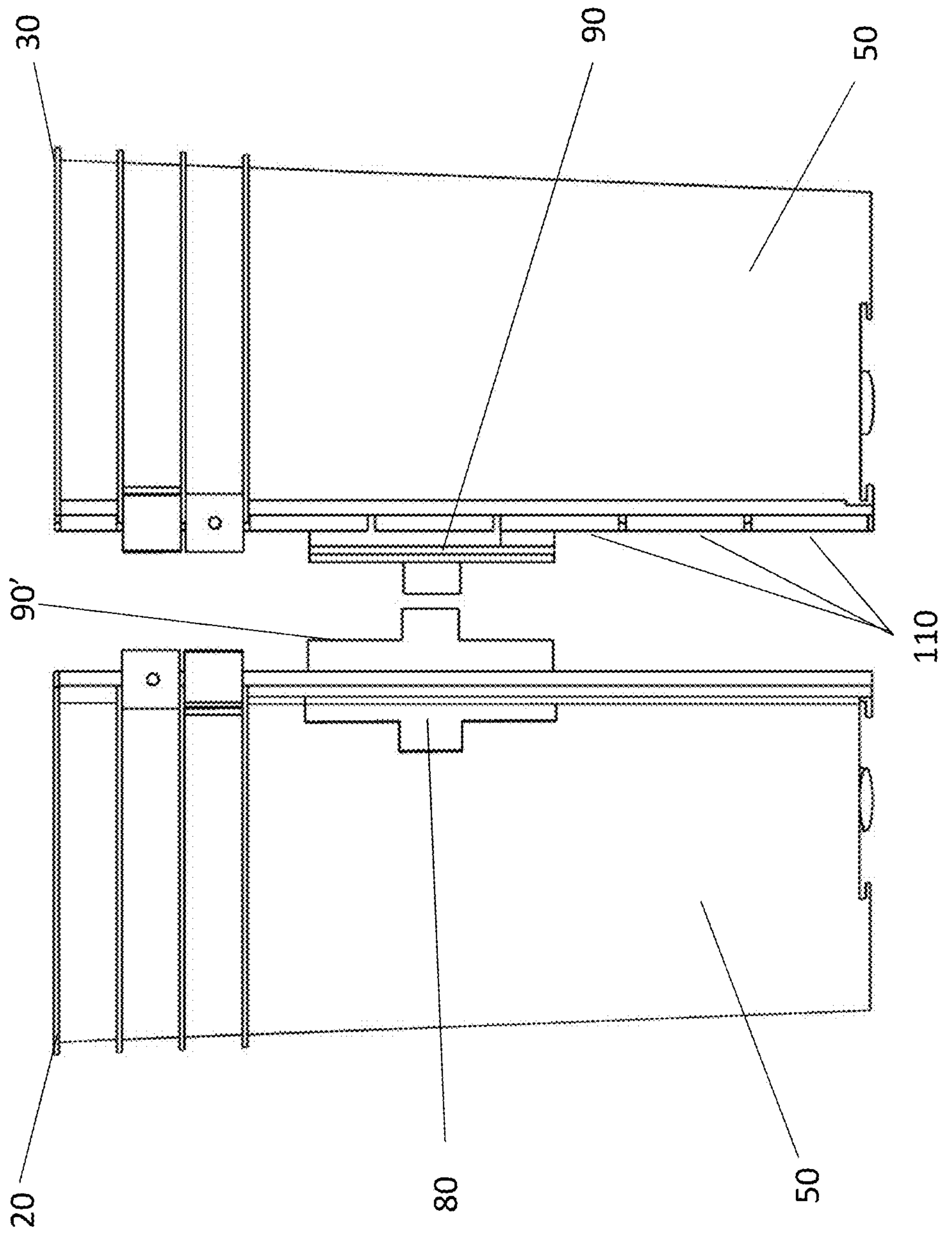
FIG. 5 is a side view of two interlocking containers spaced apart prior to being interlocked to one another for form a container according to one embodiment of the present disclosure.
Figure 6:
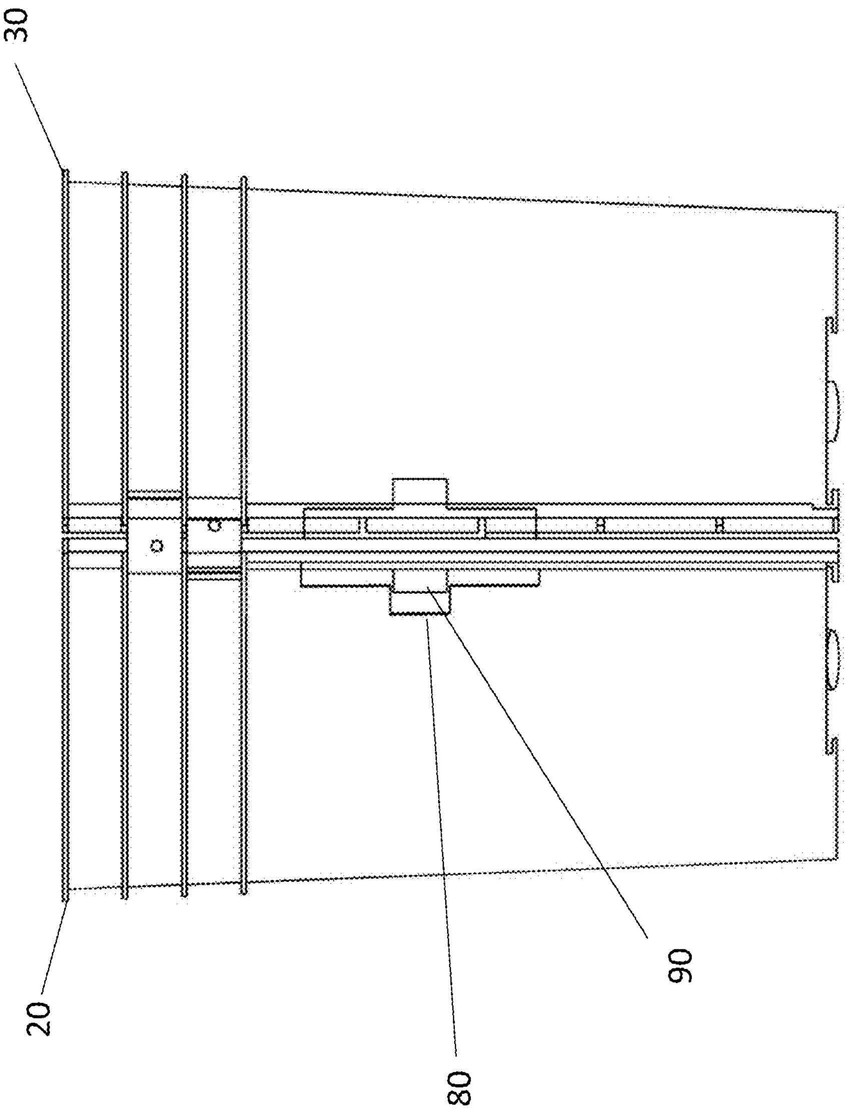
FIG. 6 is another side view of two interlocking containers slightly spaced apart prior to being interlocked to one another for form a container according to one embodiment of the present invention
Figure 7:
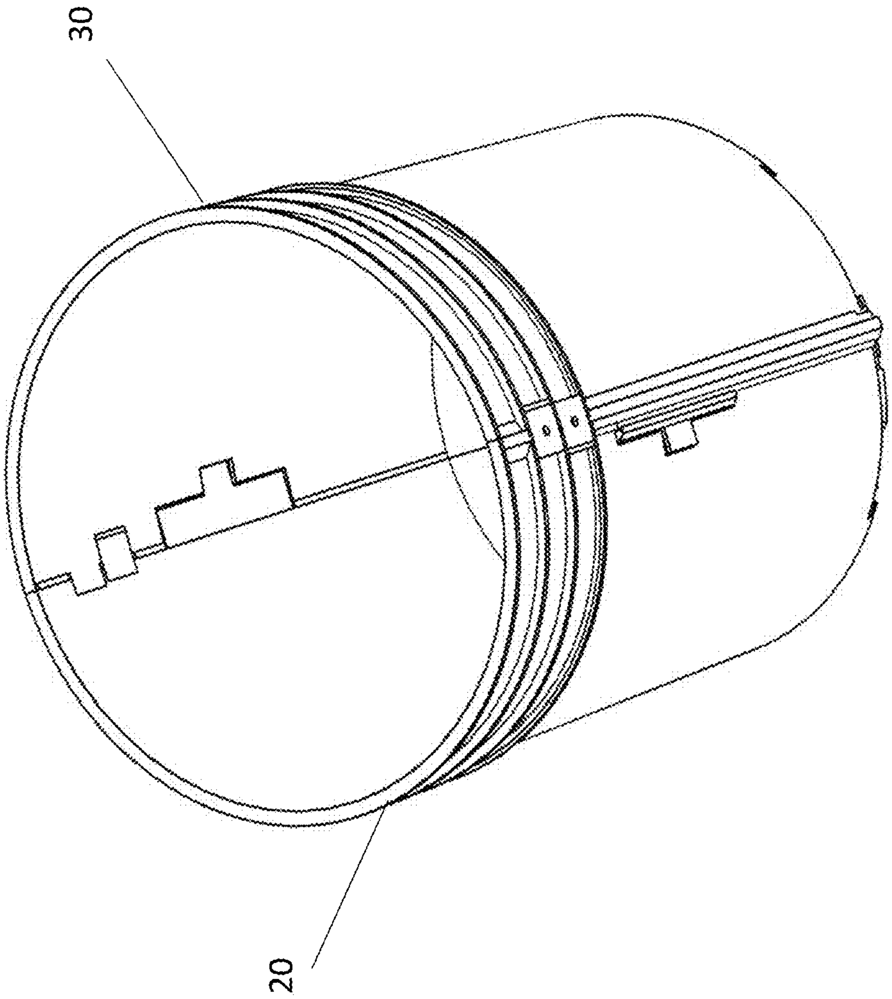
FIG. 7 is a top perspective view of two interlocking containers interlocked to one another for form a container according to one embodiment of the present invention

With reference to FIGS. 5-7 and according to one embodiment of the present disclosure, the interlocking of two interlocking container modules are shown. Interlocking container modules 20 and 30 are positioned in a manner wherein the perimeter walls 50 on each module are opposite of one another in order to form the inner portion of a container. As each module is moved closer to one another, the first interconnecting member 80 receives second interconnecting member 90 in a male—female relationship allowing to lock each module to one another to form a container. Guiding teeth 110 are guided into receiving slots (now shown) in to form a rigid container perimeter wall. With specific reference to FIG. 5, interconnecting member 90' is part of module 20 whereas interconnecting member 90 is part of module 30. With specific reference to FIG. 7, the interconnecting members from each module are shown as being interconnected forming container 10 of the present disclosure.

Figure 8:
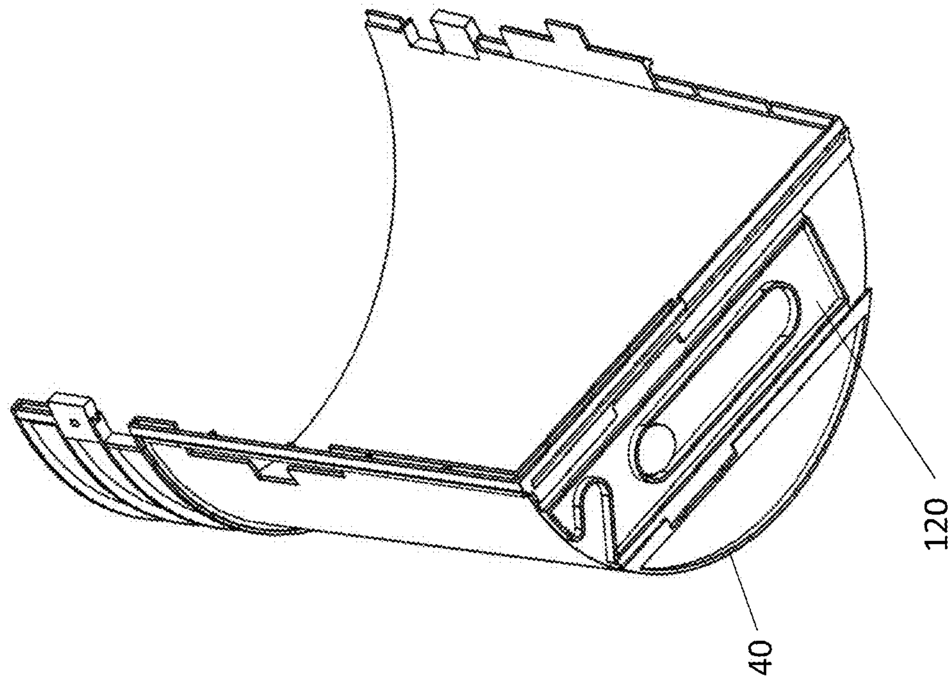
FIG. 8 is a bottom perspective view of an interlocking container module having a stabilizing member positioned on the bottom surface of the module according to one embodiment of the present disclosure.
Figure 9:
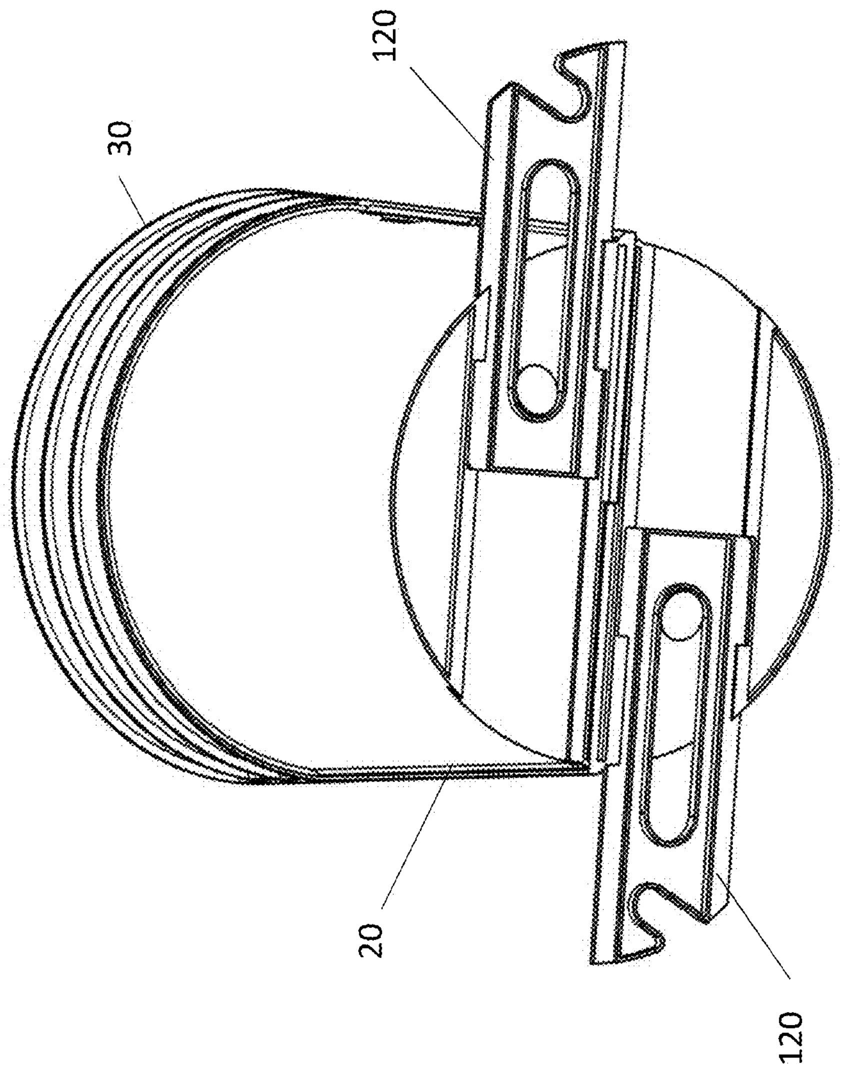
FIG. 9 is a bottom perspective of a modular container having two stabilizing members extended allowing to stabilize the container when used to mix materials according to one embodiment of the present disclosure.
Figure 10:
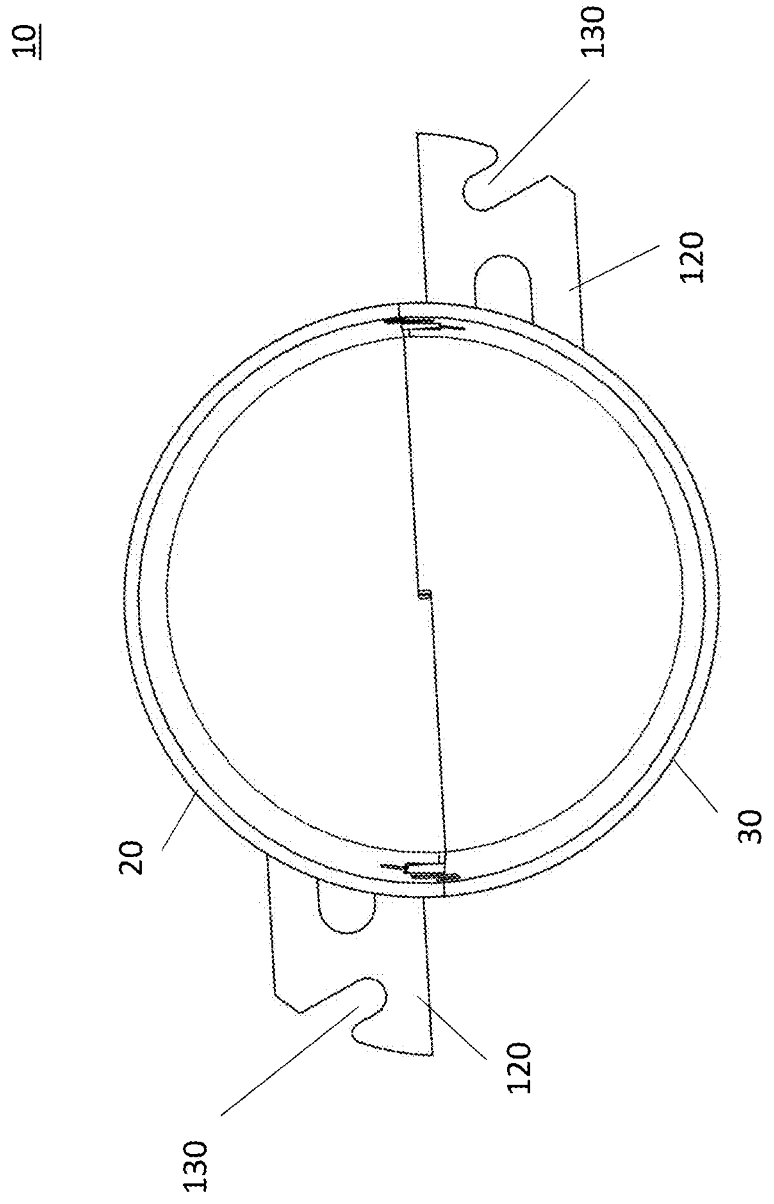
FIG. 10 is a top view of a modular container having two stabilizing members extended allowing to stabilize the container when used to mix materials according to one embodiment of the present disclosure.

With reference to FIGS. 8-10 and according to one embodiment of the present disclosure, an interlocking module 20 has a stabilizing member 120 positioned on bottom surface 40. Stabilizing member 120 is a slidable member which can be extended or retracted underneath bottom surface 40. When stabilizing member 120 is extended a person can apply pressure upon stabilizing member 120 which will secure the module 20 on a surface. With specific reference to FIGS. 9-10, stabilizing members 120 are extended in each module 20 and 30 of container 10 allowing a person to position their feet onto each stabilizing members 120 assuring container 10 will not move when mixing materials such as paint, cement or grout for example.

With further reference to FIG. 10 and according to one embodiment of the present disclosure, a deployment notch 130 is positioned at the end of stabilising members 120. Deployment notch 130 allows to easily slide out slidable members 120 when slidable members 120 are not deployed from bottom surface 40. For example, a person using slidable members 120 can insert a finger in deployment notch 130 to deploy sladable member 120 away from bottom surface 40.

Figure 11:
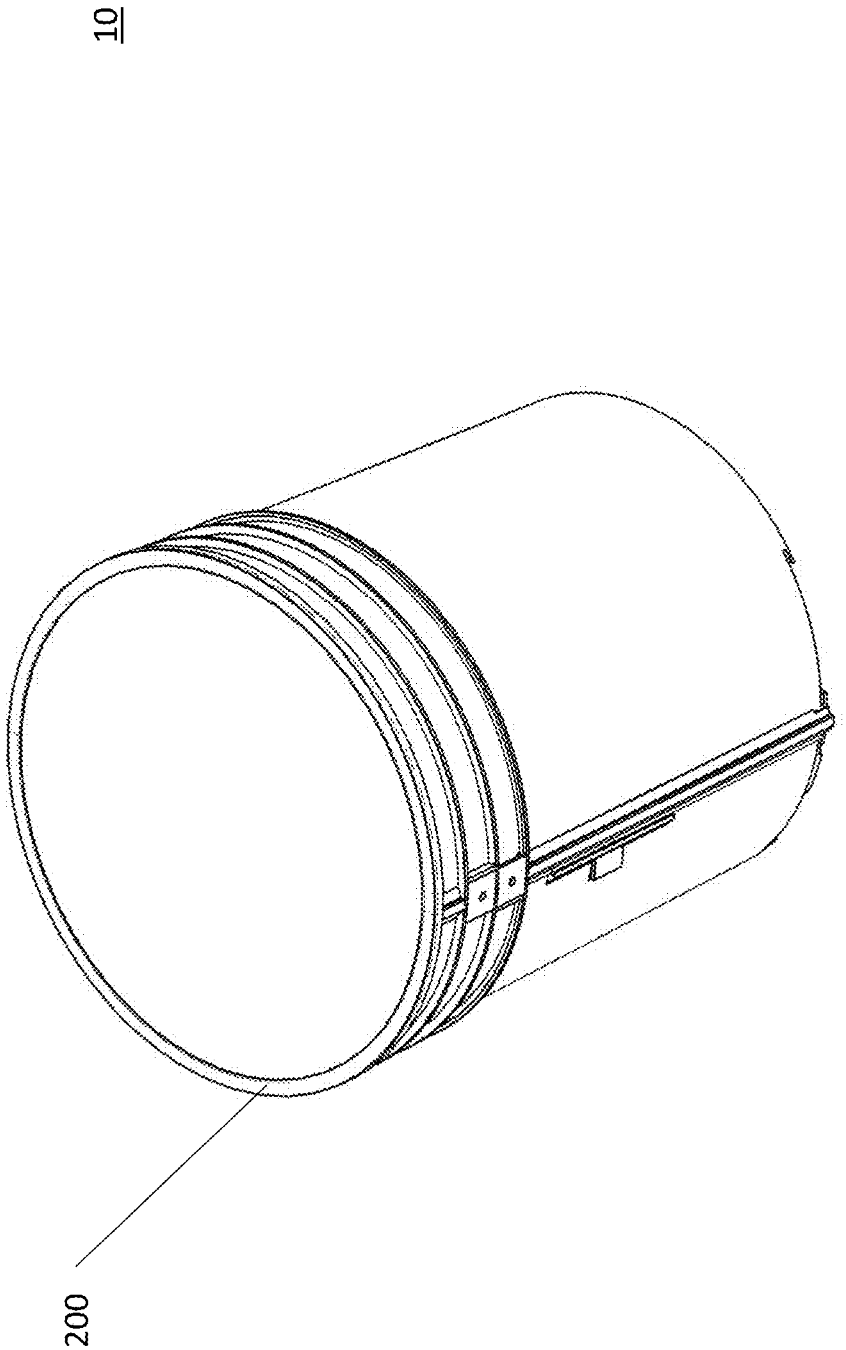
FIG. 11 is a top perspective view of a modular container having a lining according to one embodiment of the present disclosure.
Figure 12:
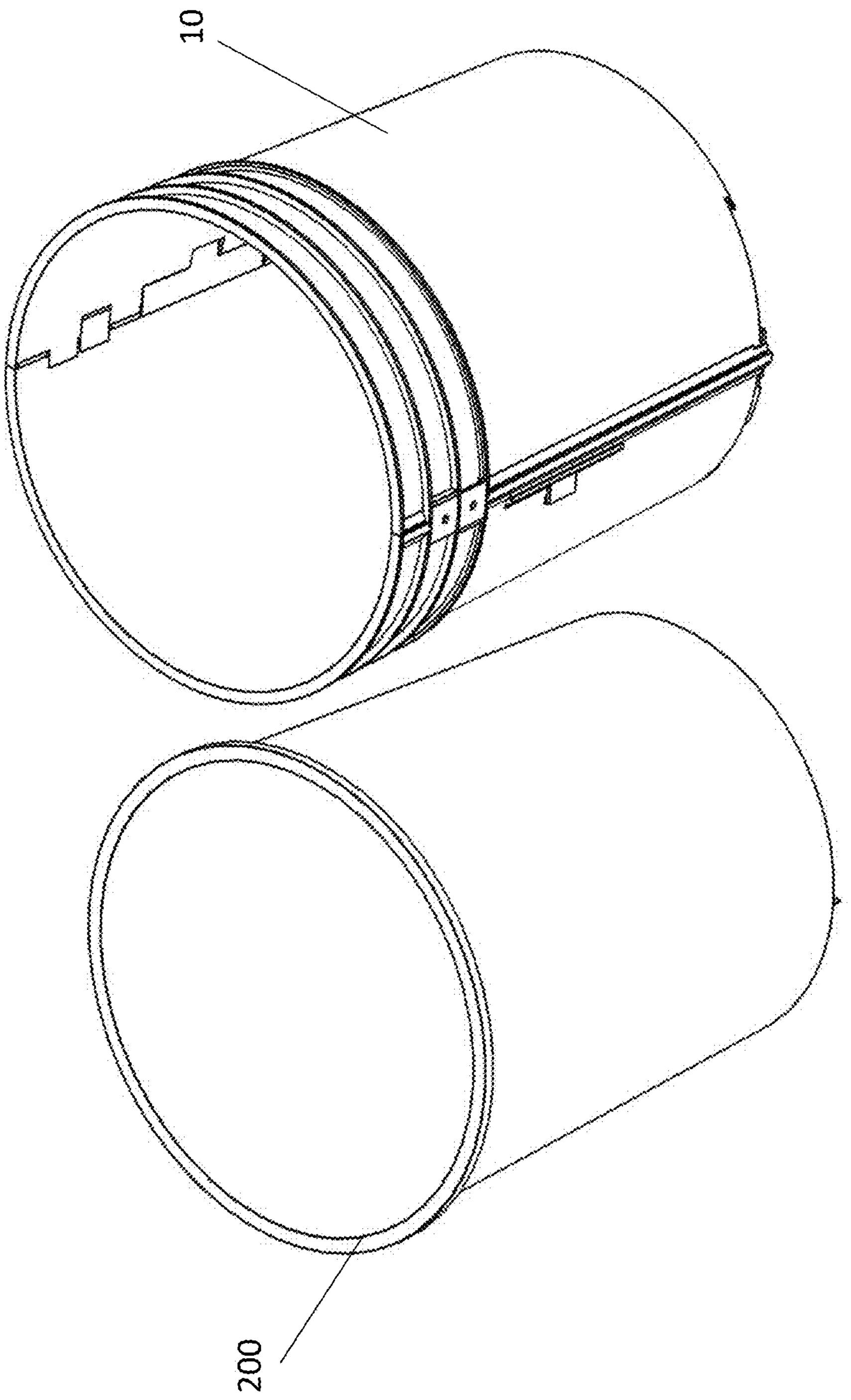
FIG. 12 is a perspective view of a modular container and a lining for use with the modular container according to one embodiment of the present disclosure.

With reference to FIGS. 11-12 and according to one embodiment of the present disclosure, container 10 is shown with a lining 200. With specific reference to FIG. 11, lining 200 is positioned within the inner cavity of container 10. The use of a lining provides an easy method to clean a container after use since the lining can simply be removed in order to clean the container.

Figure 13:
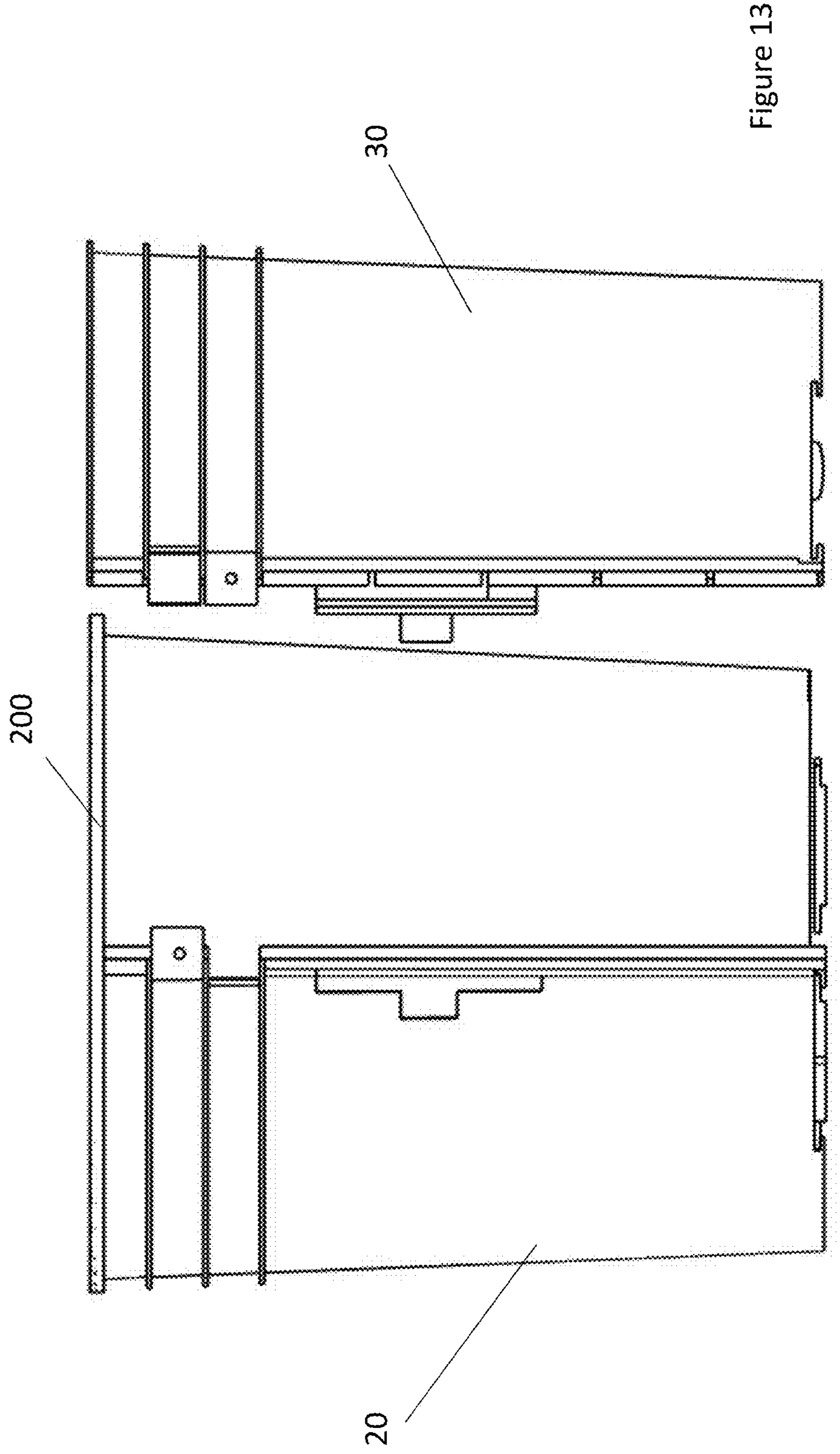
FIG. 13 is a side view of a modular container being disassembled in order to remove the lining from the modular container according to one embodiment of the present disclosure.

With reference to FIG. 13 and according to one embodiment of the present disclosure, container module 30 is unlocked from container module 20 allowing easy access to the lining 200 for removal. Without the ability to unlock the interlocked container modules 20 and 30, the removal of lining 200 can be difficult and time consuming as a lining in a standard container can remained wedged within the bottom of a container.

Figure 14:
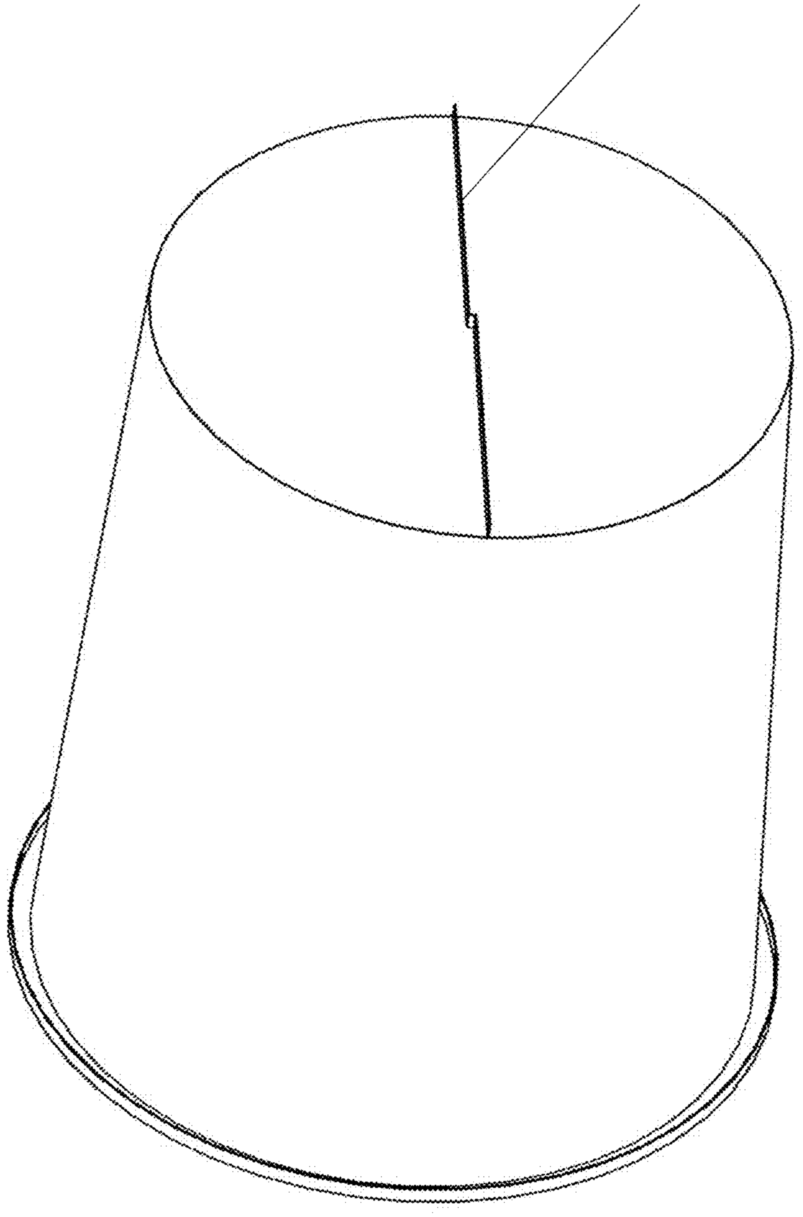
FIG. 14 is a bottom perspective view of a lining having a guiding rib for securing the lining within a modular container according to one embodiment of the present disclosure.

With reference to FIG. 14 and according to one embodiment of the present disclosure, a lining 200 for use in a container formed by two container modules is shown. The lining 200 has a guiding rib 210 positioned on the bottom portion of the lining 200 which rib is wedged to the bottom surface of two container modules interconnected to one another in order to form a container of the present disclosure. By wedging rib 210 in the guiding teeth and receiving slots of the bottom surface of a container this will avoid the lining spinning when materials are mixed within a container of the present disclosure.

Figure 15:
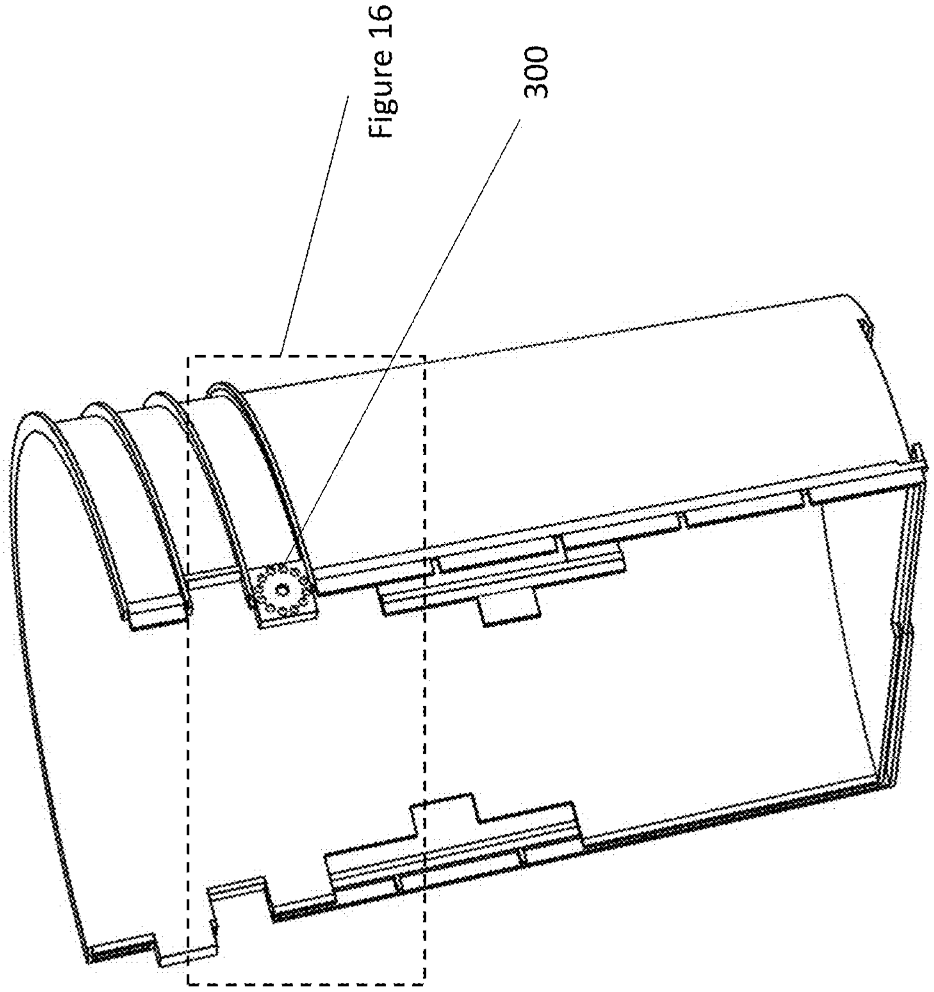
FIG. 15 is a perspective view of an interlocking container module having control ridges positioned on the module to control movement of a handle according to one embodiment of the present disclosure.
Figure 16:
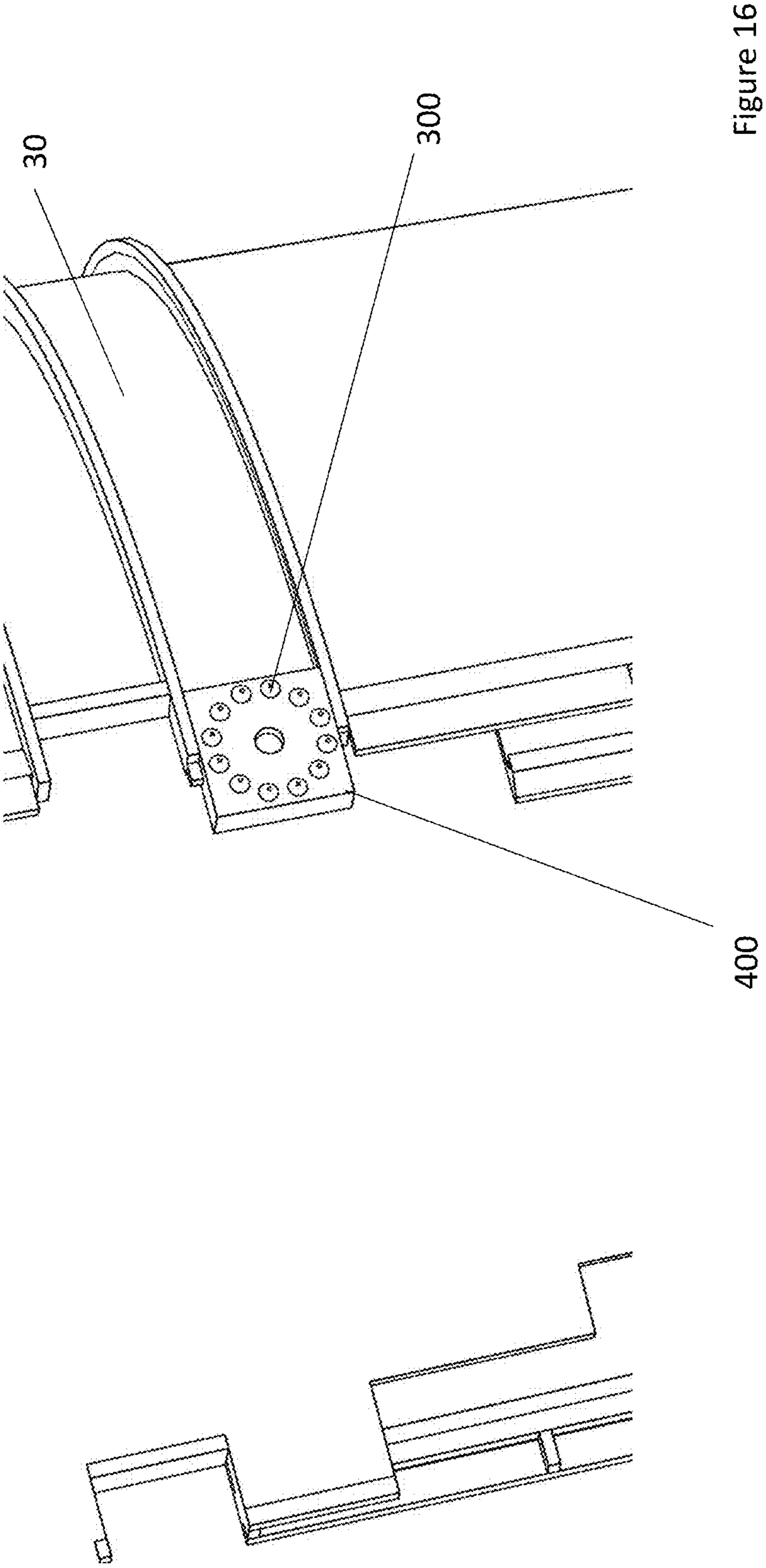
FIG. 16 is an enlarged view of the ridges shown in FIG. 15 according to one embodiment of the present disclosure.

With reference to FIGS. 15-16 and according to one embodiment of the present disclosure, a container module 30 is shown having ridges 300 positioned on handle protrusion 400 wherein a handle (not shown) can be secured to the container module 30. A worker skilled in the relevant art would be familiar with the various applications which allows for a handle to be secured to handle protrusion 400 as shown in FIGS. 15 and 16. Ridges 300 control movement of a handle (not shown) by being interconnected to opposing ridges positioned on the handle. A circle of ridges 300 interconnect to a similar circle of ridges positioned on a handle. A handle (not shown) secured to handle protrusion 400 will rotate around handle protrusions 400 and the ridges on the handle will overlap with ridges 300 allowing to control the movement of a handle (not shown) when ridges 300 are positioned in between the ridges on the handle.

Figure 17:
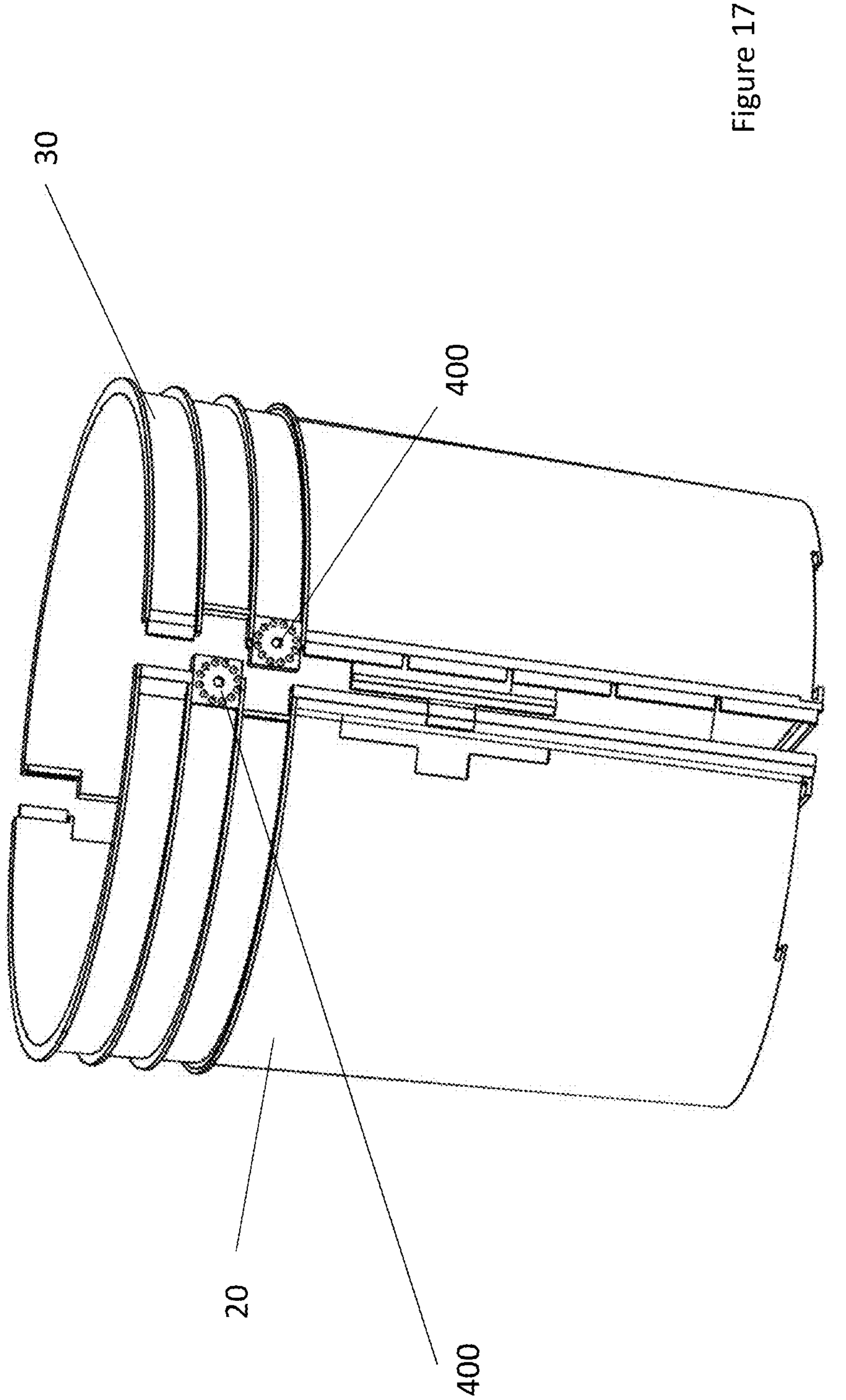
FIG. 17 is a perspective view of two container modules with control ridges prior to assembly to form a container according to one embodiment of the present disclosure.
Figure 18:
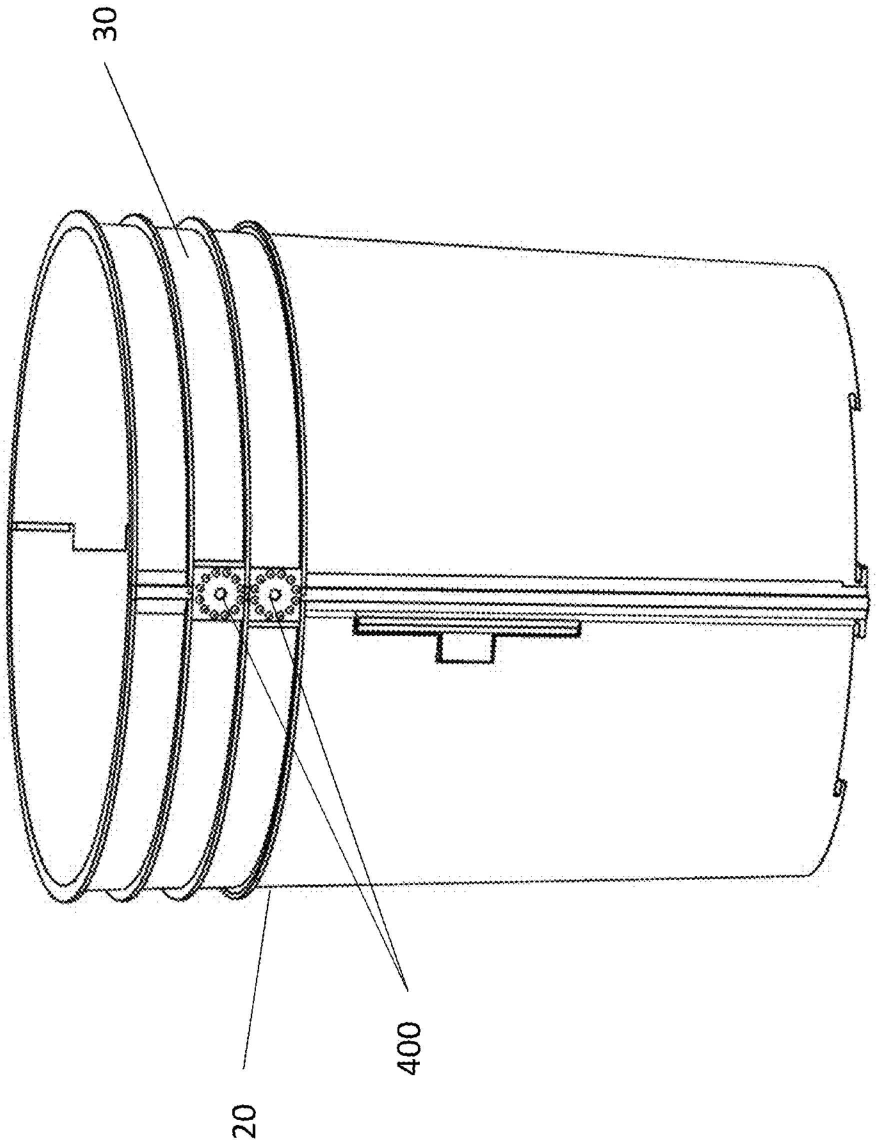
FIG. 18 is a perspective view of a container having the control ridges positioned on the two container modules according to one embodiment of the present disclosure.

With reference to FIGS. 17-18 and according to one embodiment of the present disclosure, two container modules 20 and 30 are spaced apart prior to being assembled to form a container. Handle protrusions 400 on each container module are off set from one another in order to position the handle protrusions 400 one on top of each other as shown in FIG. 18. This placement of handle protrusions 400 one on top of each other allows to center a handle (not shown) when a container is formed using two container modules of the present disclosure. A handle will only be installed on one module and in order to form a container using two container modules of the present disclosure a module not having a handle can be used with a module having a handle in order to form a container. The centering of a handle in a modular container of the present disclosure will facilitate displacement of the container through the handle.

A worker skilled in the relevant art would also be familiar with a number of different applications allowing to secure two interlocking modules of the present disclosure. For example, bungee cords, wing nuts positioned on each module, ratchet straps, rope, Velcro, rubber tie downs, hooks which can be snapped on an opposite module or any other type of securing application used to secure two modules.

Figure 19:
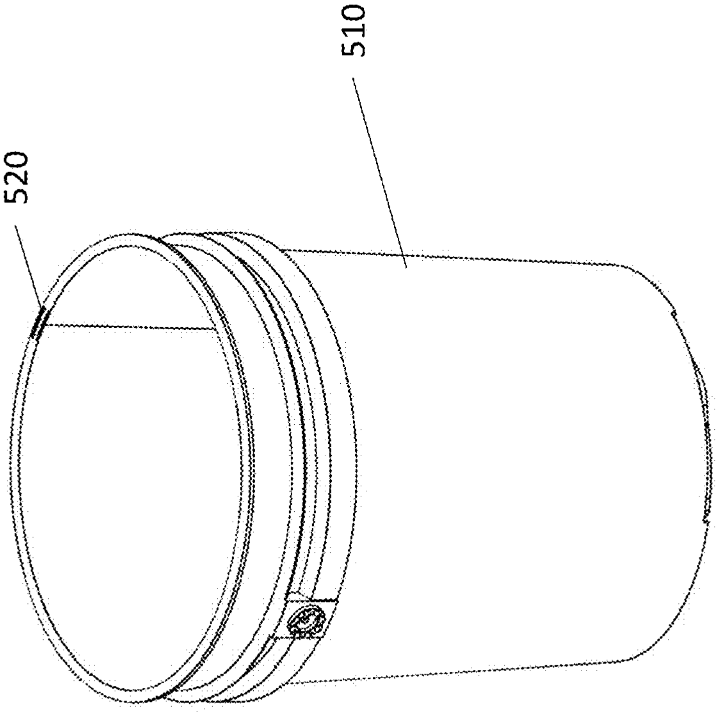
FIG. 19 is a perspective view of a container with an interchangeable liner according to another embodiment of the present disclosure.
Figure 20:
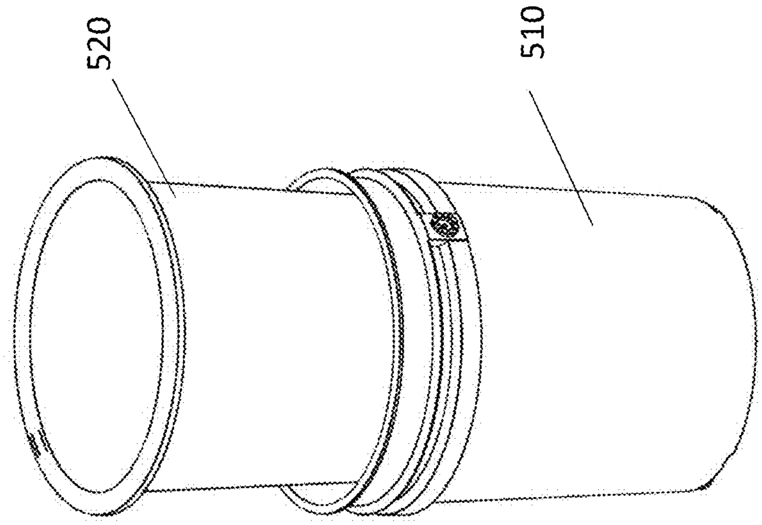
FIG. 20 is a perspective view of a container with the interchangeable liner displaced from within the container according to another embodiment of the present disclosure.

With reference to FIGS. 19 and 20 and according to another embodiment of the present disclosure, a container having an interchangeable liner 500 with container 510 and liner 520 is shown. The liner 520 is placed within container 510 with the liner 520 being removable after a substance has been mixed in the container 510 in one example.

Figure 21:
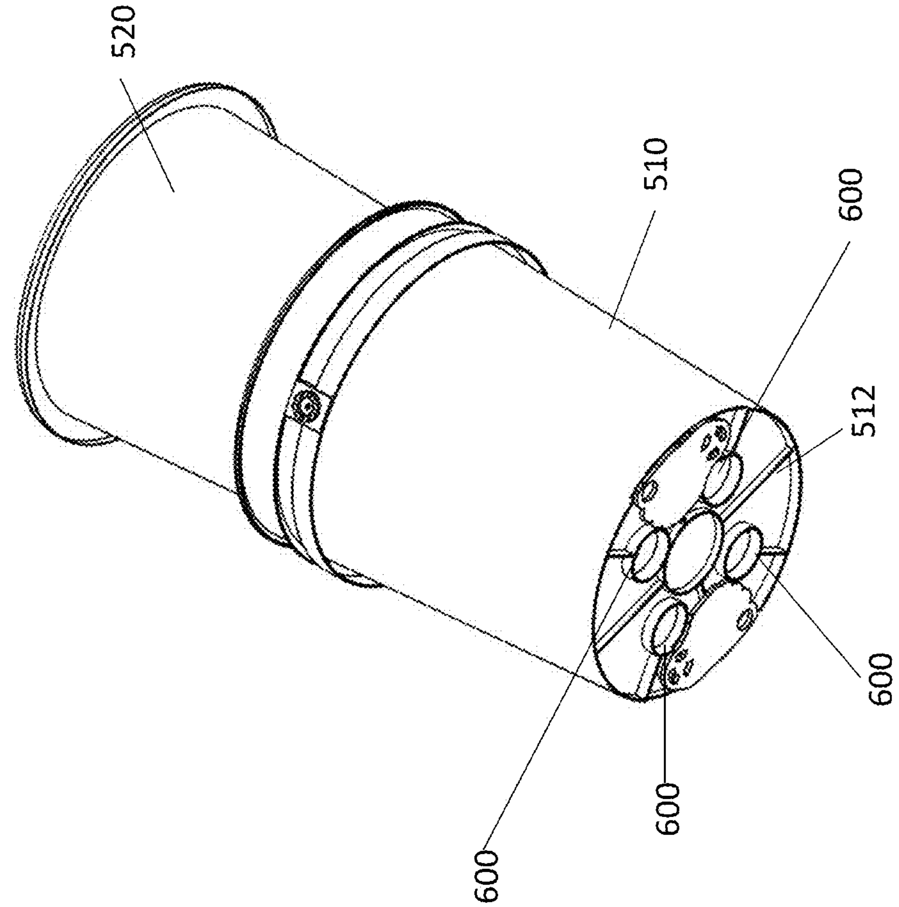
FIG. 21 is an underside perspective view of a container with an interchangeable liner with securing apertures according to another embodiment of the present disclosure.
Figure 22:
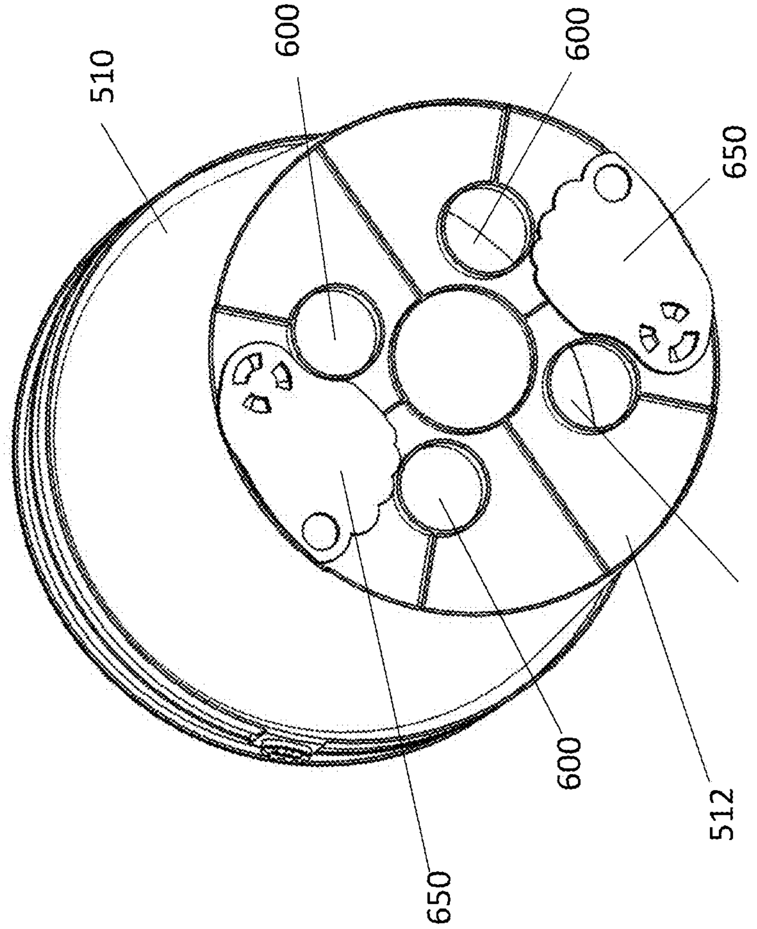
FIG. 22 is an underside perspective view of a container with an interchangeable liner with stabilizing members according to another embodiment of the present disclosure.
Figure 23:
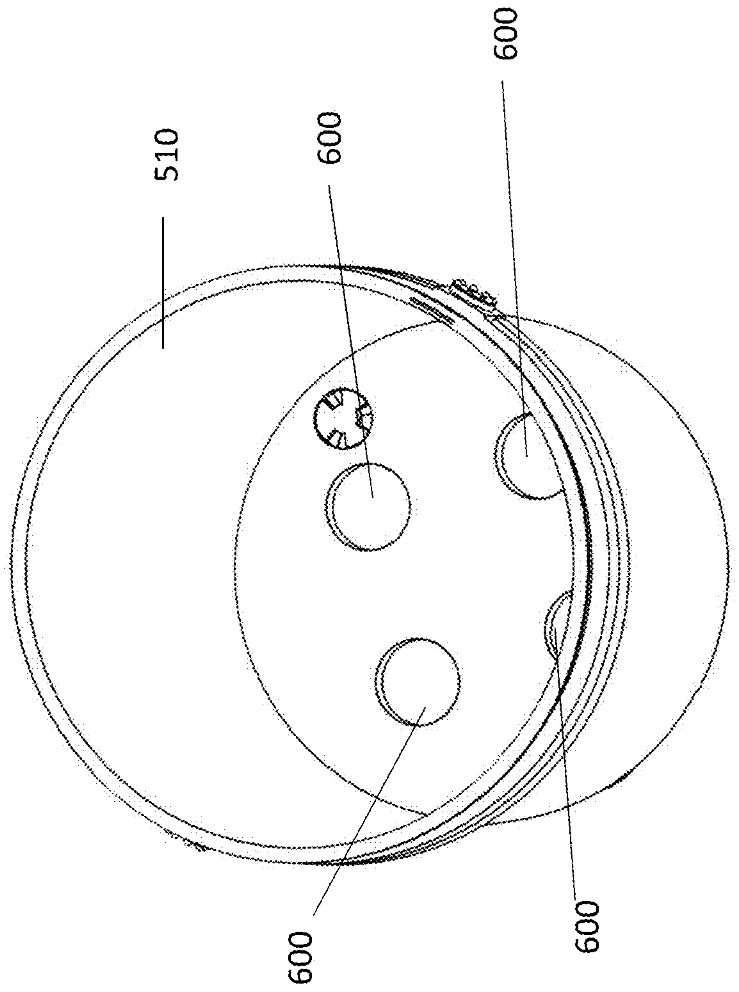
FIG. 23 is a top perspective view of a container having securing apertures according to another embodiment of the present disclosure.

With reference to FIGS. 21-23 and according to another embodiment of the present disclosure, container 510 has a bottom portion 512 with securing apertures 600 which can receive the liner 520. The securing apertures 600 enable the liner to position itself within the securing apertures. A problem encountered when using liners in containers is the fact that the liner will vacuum seal itself within the container. The presence of the securing apertures 600 diminishes any vacuum effect between the liner and container as will be further explained below.

With reference to FIG. 22 and according to another embodiment of the present disclosure, container 510 has securing apertures 600 and stabilizing members 650 allowing to secure container 510 when a substance is being mixed within the container through the use of a mixing tool commonly used to mix paint, concrete, grout or any substance which requires mixing before use. The diameter of the securing apertures 600 can be varied based on the diameter of the mixing tool. In a preferred embodiment, the diameter of the securing apertures 600 is less than the diameter of the mixing tool. By assuring the diameter of the securing apertures are less than the mixing tool this assures that the mixing tool will not be stuck or jam in the securing apertures 600. The liner does provide some resistance from the mixing tool getting stuck or jammed within the securing apertures. This result is however eliminated if the mixing tool has a greater diameter than the securing apertures 600. The shape of the securing apertures 600 can be round, square, triangular or any other shape allowing for a liner to be secured within the securing apertures 600.

Figure 24:
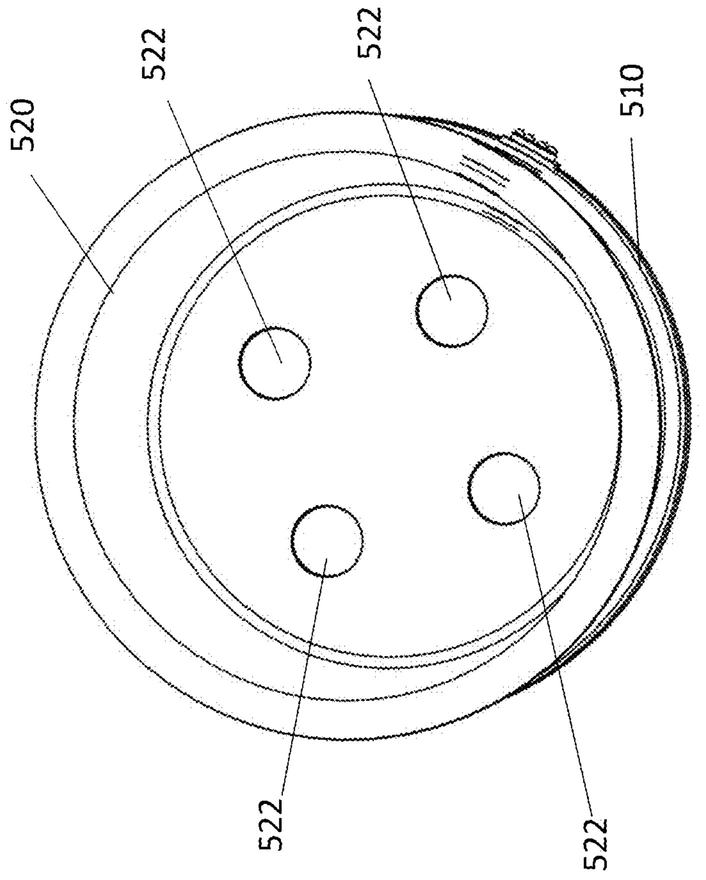
FIG. 24 is a top perspective view of a container having an interchangeable liner with securing protrusions according to another embodiment of the present disclosure.
Figure 25:
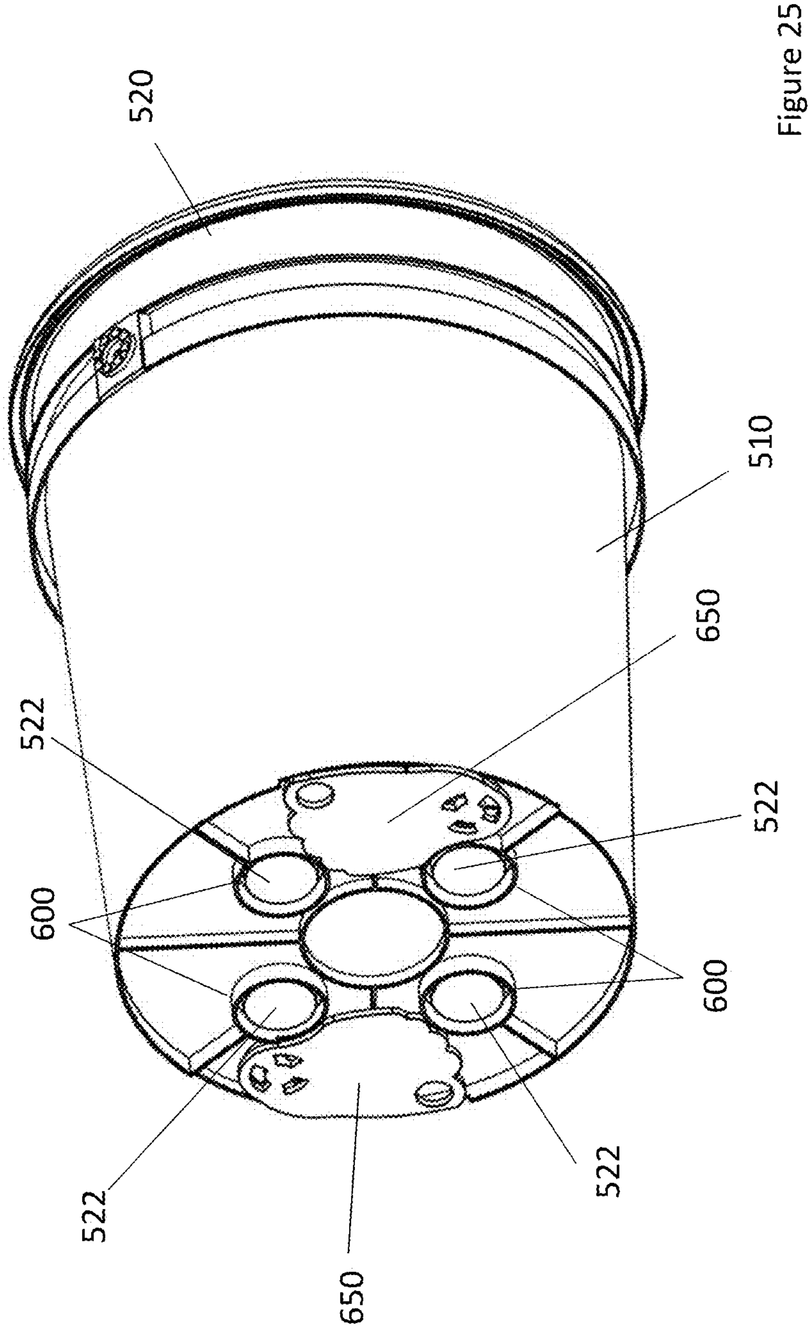
FIG. 25 is a side perspective view of an interchangeable liner positioned within a container with the securing protrusions positioned within the securing apertures according to another embodiment of the present disclosure.
Figure 26:
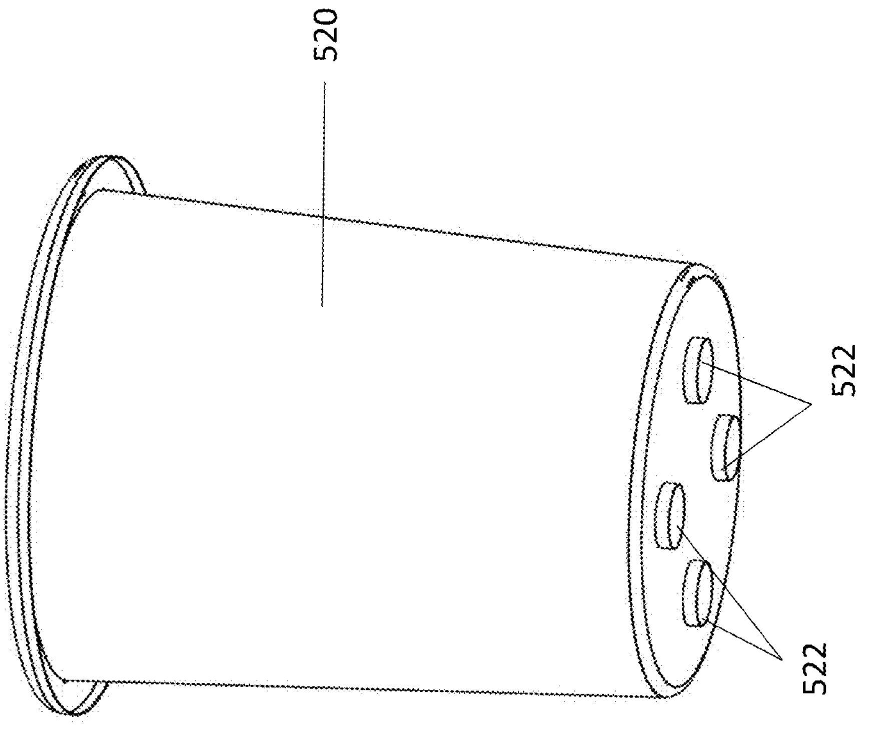
FIG. 26 is a side perspective view of an interchangeable liner with securing protrusions according to another embodiment of the present disclosure.

With reference to FIGS. 24-26 and according to another embodiment of the present disclosure, liner 520 is positioned within container 510 with liner 520 having securing protrusions 522 which align with the securing apertures 600 in container 510. Securing protrusions 522 extend away from the liner and when positioned within the securing apertures 600 provide a lock of the liner 520 to the container 510 since a portion of the liner 520 extends beyond the walls of container 510. The lock will assure the liner 520 does not spin within the container 510 when a substance is mixed in the liner.

Figure 27:
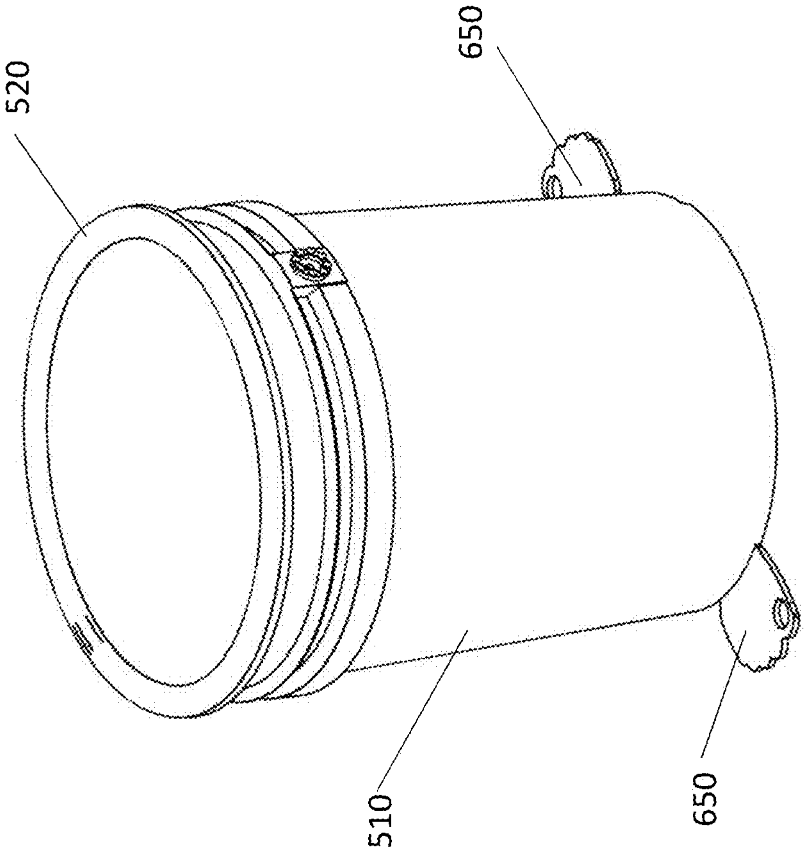
FIG. 27 is a side perspective view of a container with an interchangeable liner with the container having stabilizing members according to one embodiment of the present disclosure.
Figure 28:
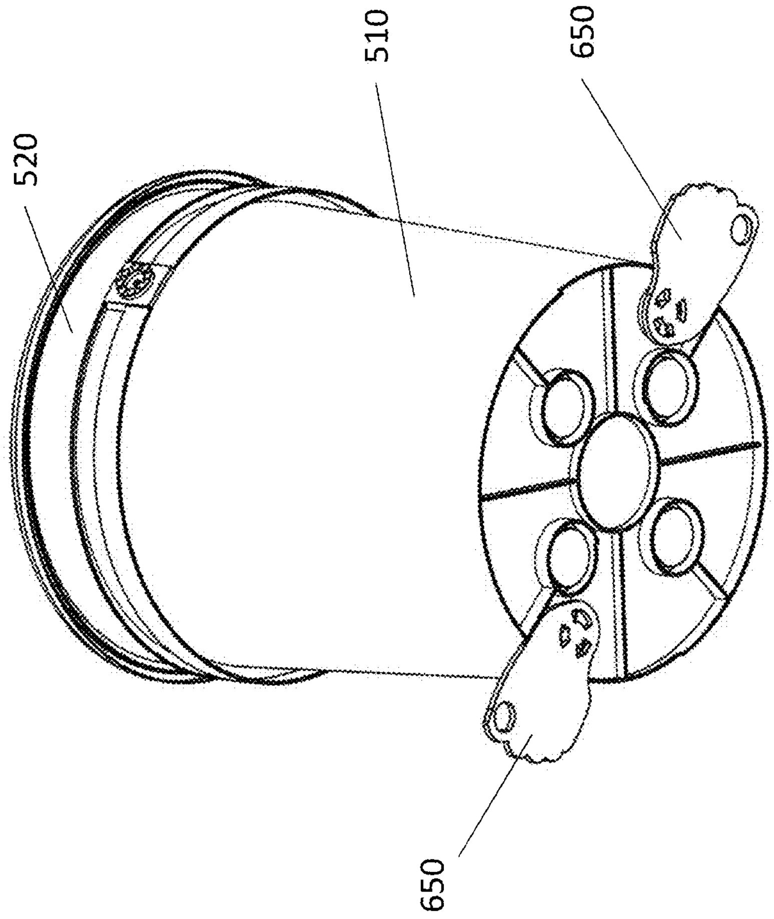
FIG. 28 is a bottom perspective view of a container with the stabilizing members in a deployed position according to one embodiment of the present disclosure.

With reference to FIGS. 27 and 28 and according to another embodiment of the present disclosure, container 510 has stabilizing members 650 positioned on the bottom surface 512 which extend away from the container as shown. The stabilizing members 650 provide a user the ability to apply some pressure on the stabilizing members 650 which further secures the container 510 to a surface such as the ground when a substance is being mixed within the liner 520. With specific reference to FIG. 25, stabilizing members 650 are rotated inwards allowing to stabilizing members 650 to be on top of bottom surface 512. In this position the stabilizing members 650 are not subject to being damaged when the container is moved from various locations and allows for container 510 to be stacked into other containers. The ability to stack container 510 one into another is also advantages for shipping purposes.

Figure 29:
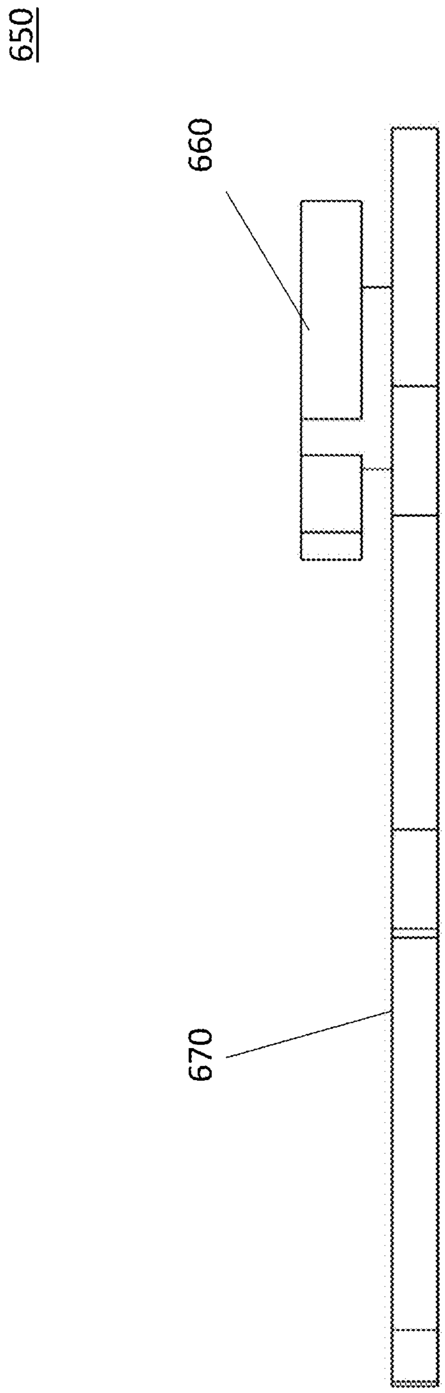
FIG. 29 is a side view of a stabilizing member for use with a container according to another embodiment of the present disclosure.
Figure 30:
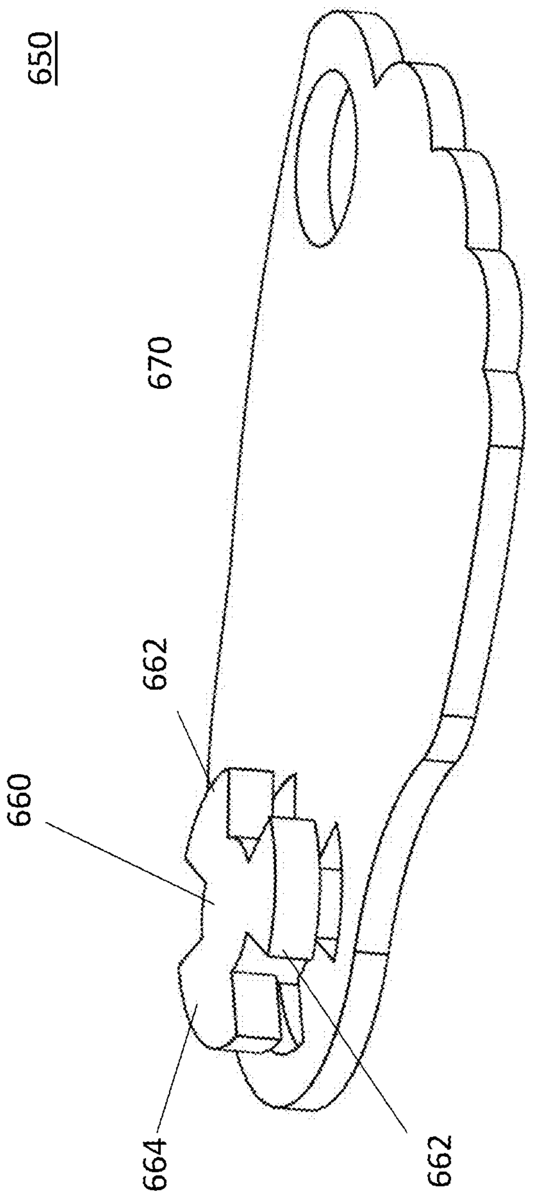
FIG. 30 is a top perspective view of a stabilizing member with locking protrusions for securing the stabilizing member to a container according to another embodiment of the present disclosure.
Figure 31:
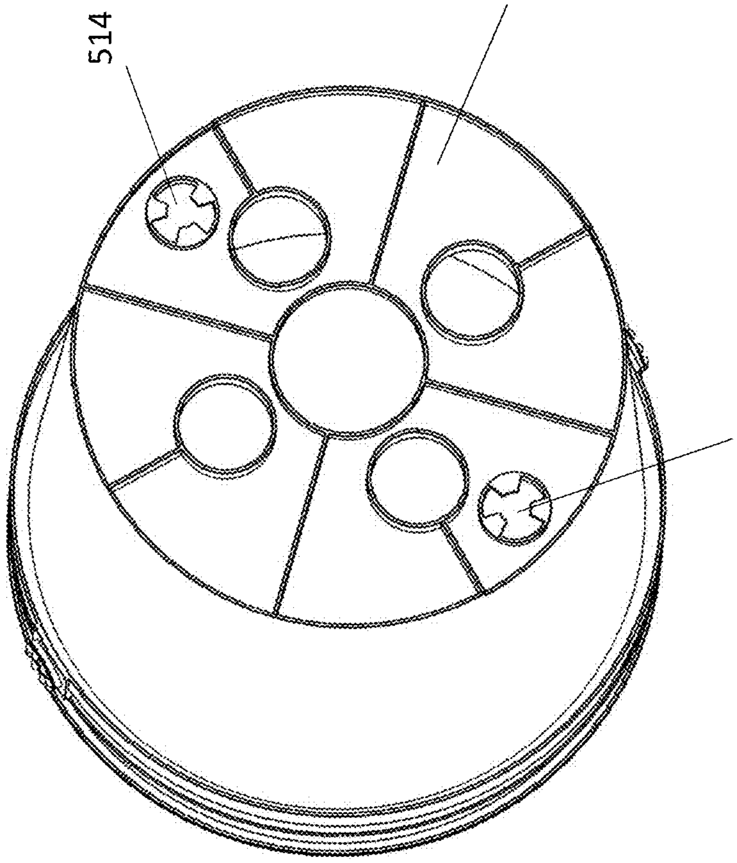
FIG. 31 is a bottom perspective view of a container showing locking apertures for securing stabilizing members to a container according to one embodiment of the present disclosure.

With reference to FIGS. 29-31 and according to one embodiment of the present disclosure, a stabilizing member 650 is shown unattached to a container. The stabilizing member 650 has a locking protrusion 660 extending away from the top surface 670 of stabilizing member 650. Locking protrusion 660 is interlocked within a locking aperture 514 on the bottom surface 512 allowing the stabilizing member to be securely attached to the bottom surface 512. The locking protrusion 660 also has triangular locks 662 and 664 wherein triangular lock 664 has a larger surface than triangular locks 662. The larger surface of triangular lock 664 allows for only a specific insertion of the stabilizing member in locking apertures 514. This specific insertion of the triangular locks 662 and 664 provide for greater stability and assures a stabilizing member is not easily removed from the bottom surface during normal use. The removal of a stabilizing member is only achieved when the stabilizing member is moved outside the range of normal use as shown in FIG. 25 (retracted position) and FIG. 27 (deployed position).

Figure 32:
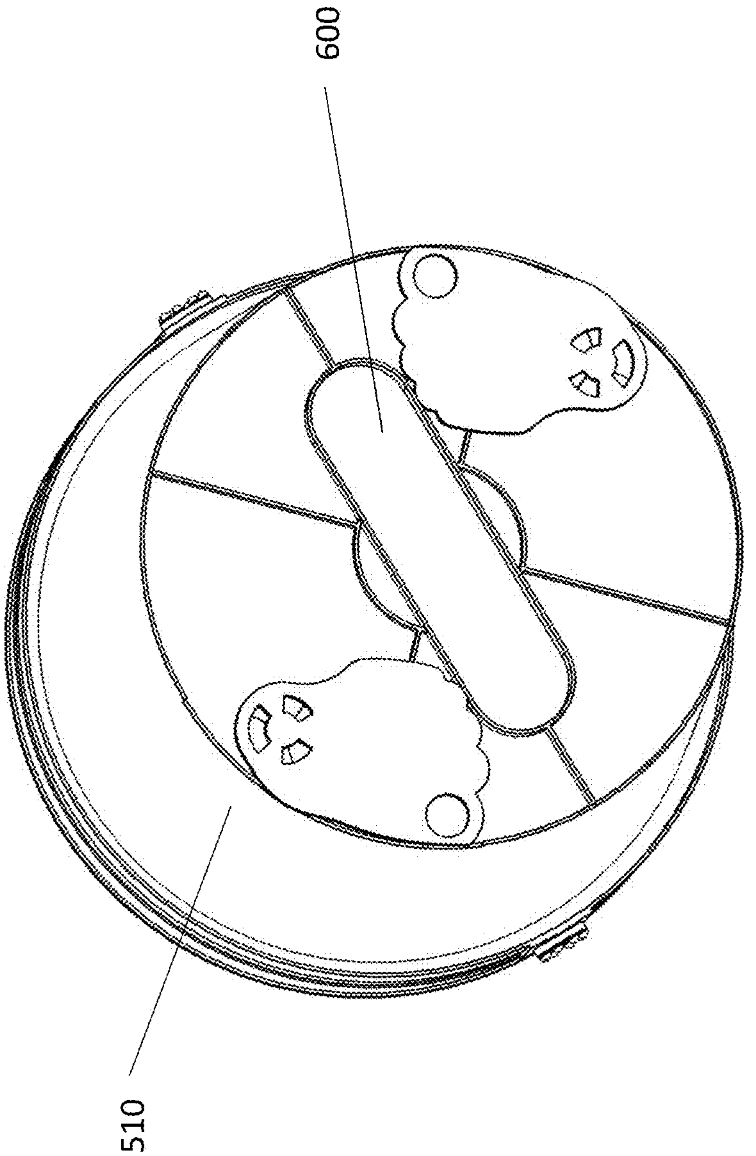
FIG. 32 is a bottom perspective view of a container having a single securing aperture on the bottom surface according to another embodiment of the present disclosure.
Figure 33:
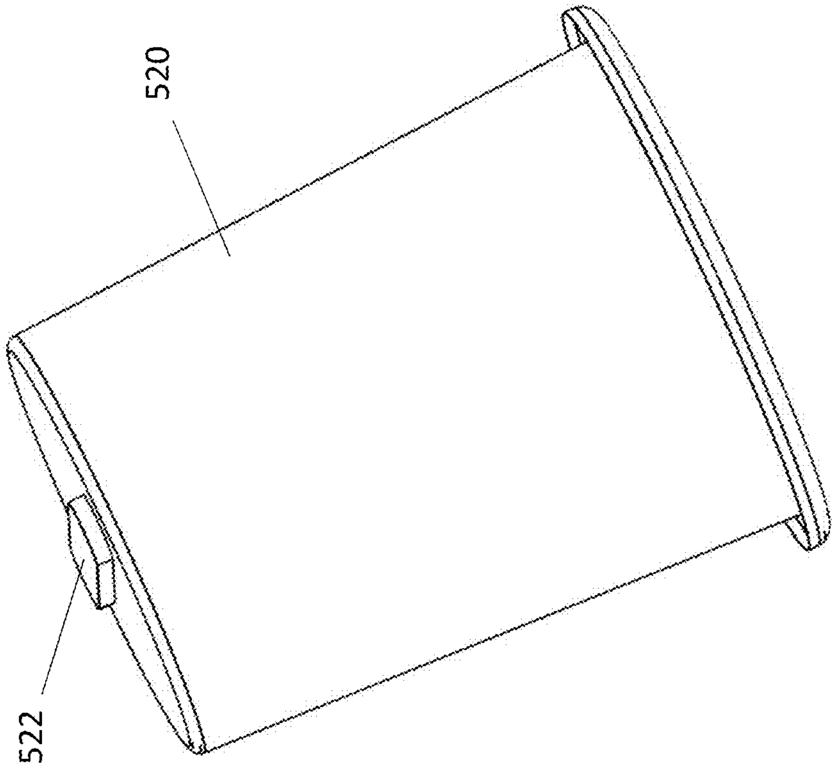
FIG. 33 is a side perspective view of an interchangeable liner having a single securing protrusion according to another embodiment of the present disclosure.

With reference to FIGS. 32 and 33 and according to another embodiment of the present disclosure, a container 510 is shown having a single securing aperture 600 for receiving the interchangeable liner 520. The purpose of the securing aperture is to lock the liner 520 to the container 510 which such lock is accomplished when the liner 520 will not rotate in container 510. As shown in FIG. 33, the liner 520 will have a securing protrusion which is identical in shape in order to allow the lock to form between a securing aperture and a securing protrusion. Accordingly, the shape of the securing aperture and securing protrusion can be varied while still providing a lock between the liner 520 and container 510. The lock is formed through the presence of a male and female member present in the liner and container. Although FIG. 32 shows an oval-shaped aperture 600 with two circles, a worker skilled in the art would appreciate that only a single oval-shaped aperture 600 is possible provided that its shape is non-symmetric to prevent the liner from spinning inside the container 510.

Figure 33A:
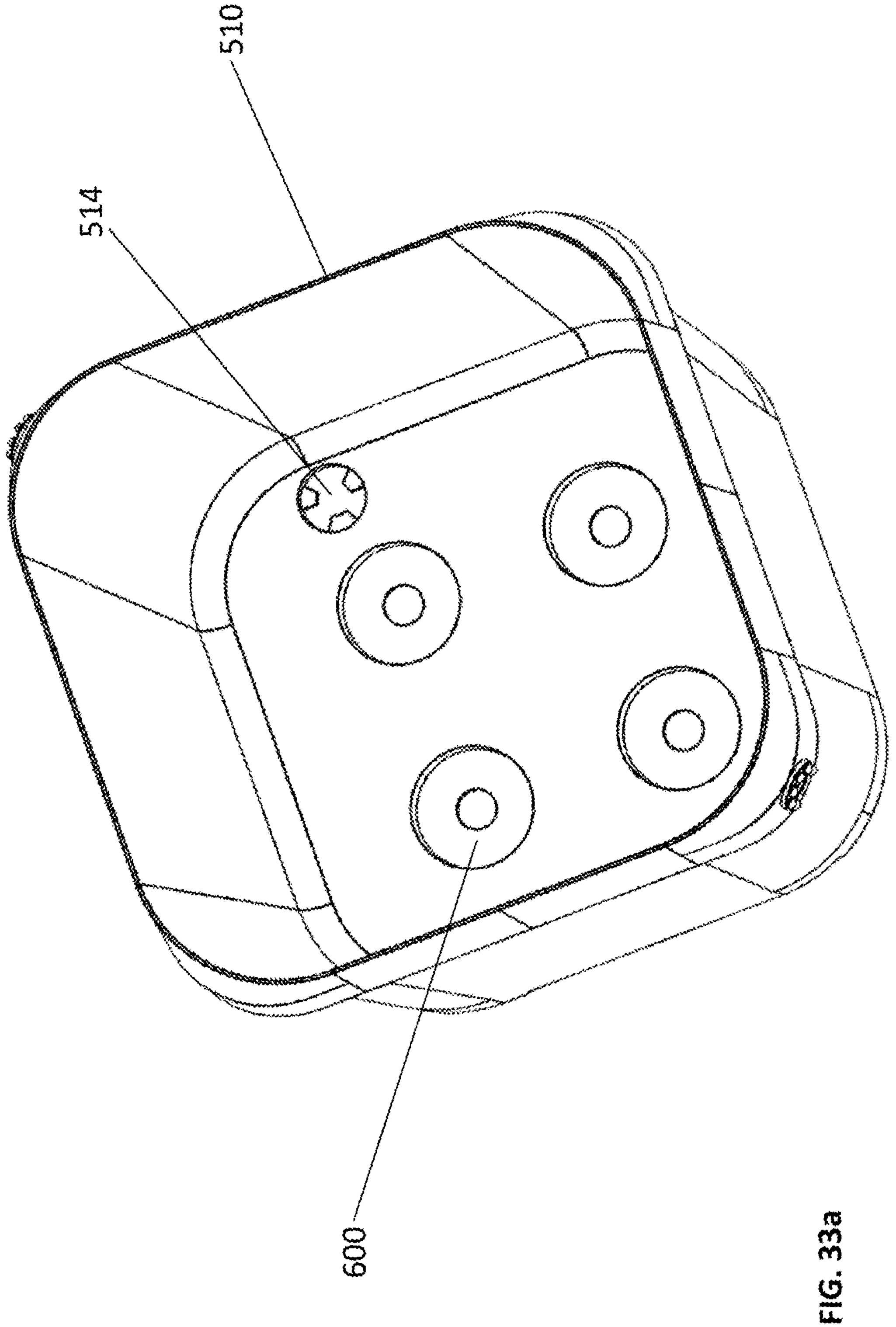
FIG. 33*a* is a perspective view of a container according to yet another embodiment of the present disclosure.

With reference to FIG. 33*a* and according to another embodiment of the present disclosure, the container 510 is shown having a square shape with rounded edges. Such a square shaped with rounded edges corresponds to the shape of a standard mixing tool in the industry, which in turn facilitates the mixing of materials within the container 510.

With reference to FIGS. 1 to 33*a* and according to an embodiment of the present disclosure, the at least one securing aperture has at least one vertically extending wall and the at least one securing protrusion has at least one vertically extending lip. The container 510 is also further comprised of at least one locking aperture positioned on the bottom portion of the container 510. The stabilizing member is pivotable and is further comprised of a locking protrusion extending away from a top surface of the at least one stabilizing member. The locking protrusion is further comprised of a first and a second triangular lock, and wherein the first triangular lock has a larger surface than the second triangular lock to enable a specific insertion of the at least one stabilizing member in the at least one locking aperture.

Figure 34:
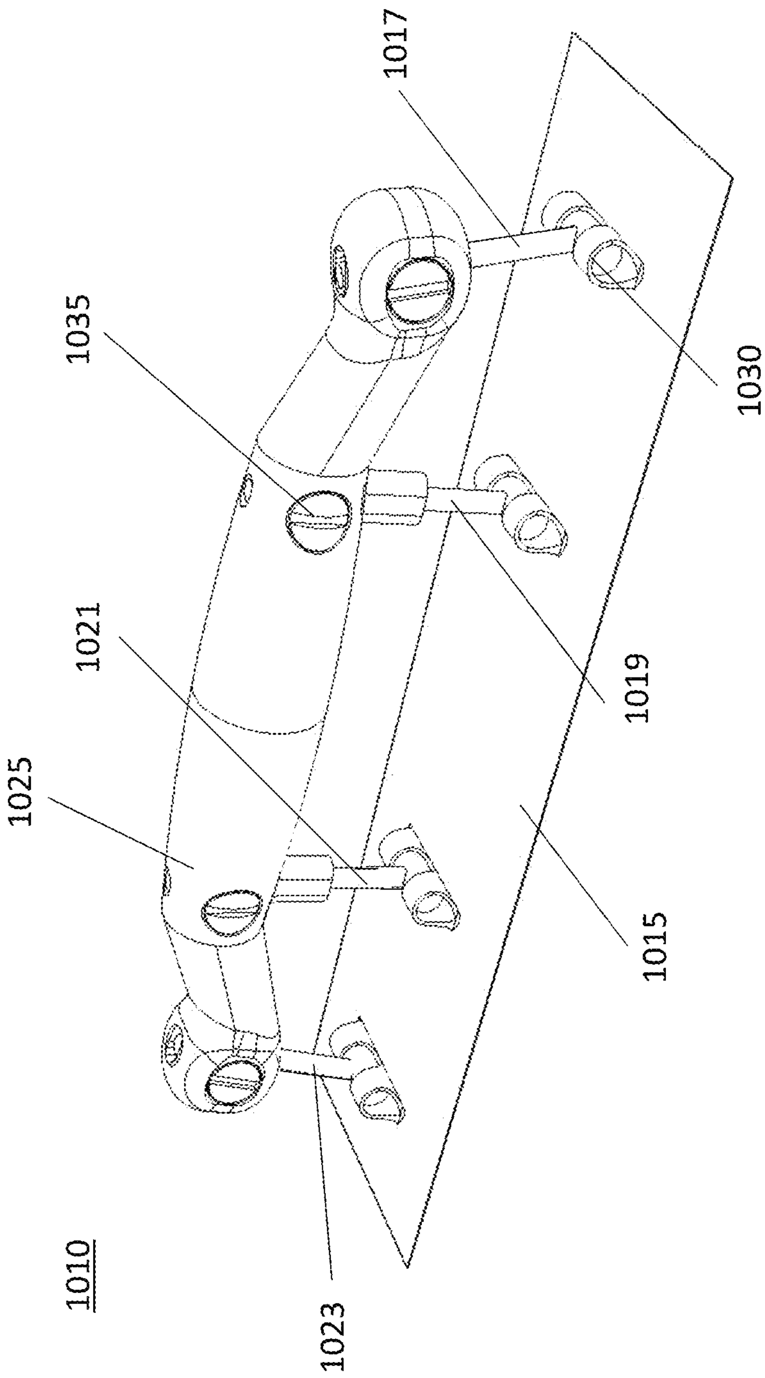
FIG. 34 is a perspective view of an adjustable trowel according to an embodiment of the present disclosure.
Figure 35:
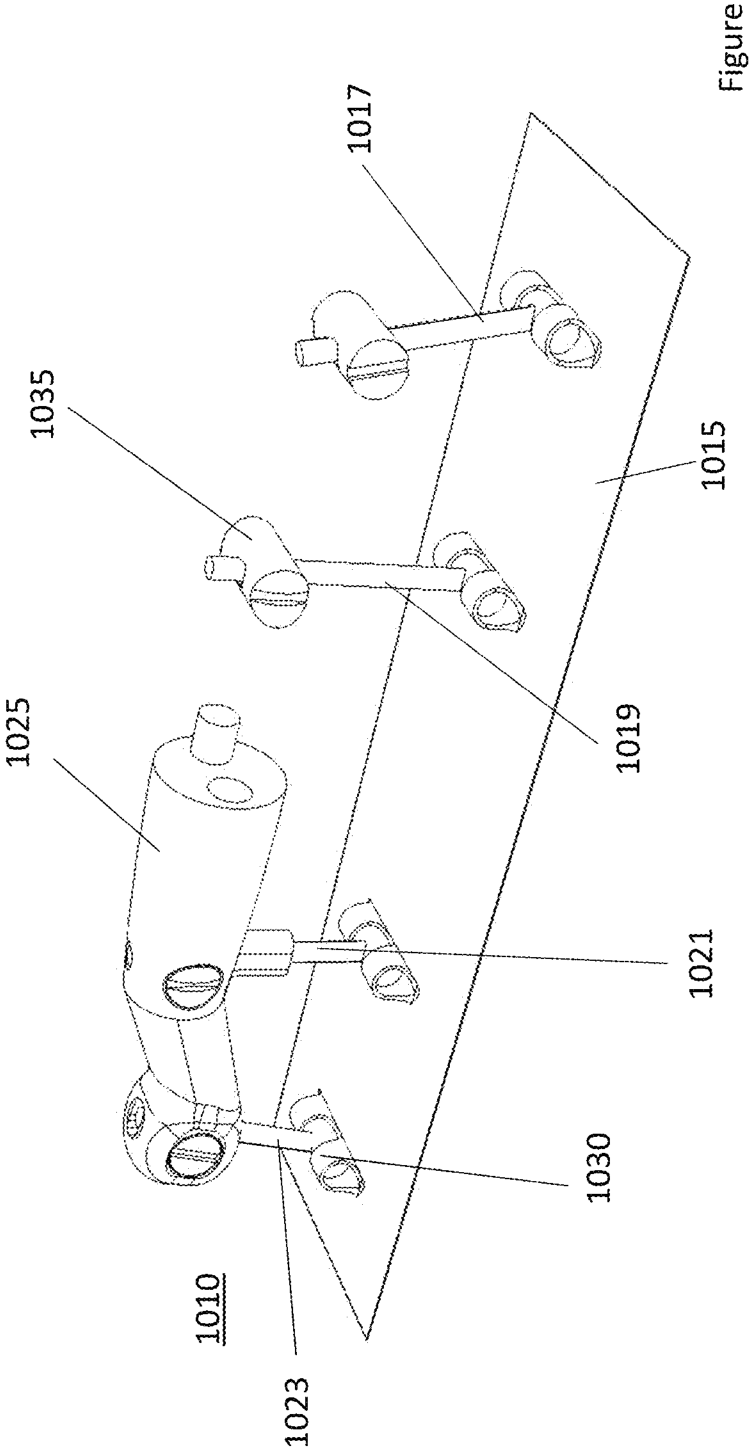
FIG. 35 is a perspective view of the adjustable trowel of FIG. 34 without half of a handle, according to an embodiment of the present disclosure.

With reference to FIGS. 34 and 35 and according to an embodiment of the present disclosure, an adjustable trowel 1010 is shown generally comprised of a blade member 1015, the blade member 1015 used to apply, smooth over or move a material such as crushed stone, cement, etc. The trowel 1010 is further comprised of four threaded rods 1017, 1019, 1021, 1023 that are secured at a first end to the blade member 1015 and at a second, opposite end to a handle 1025. While four threaded rods 1017, 1019, 1021, 1023 are shown, a worker skilled in the art would appreciate that at least two rods need to be present to properly manipulate the trowel 1010. The first end of the of the four threaded rods 1017, 1019, 1021, 1023 is secured to the blade member 1015 by means of hinges 1030. The hinges 1030 allow the four threaded rods 1017, 1019, 1021, 1023 to rotate about an axis of the hinges 1030. Such pivoting may be required during the removal of the threaded rods from the handle 1025 for cleaning, changing of the blade member 1015, disassembly of the trowel 1010 during shipping, or other purposes. The hinges 1030 also facilitate the adjustment of the blade member 1015 and help eliminate jamming of the rods 1017, 1019, 1021, 1023 within the handle 1025. The second end of the four threaded rods 1017, 1019, 1021, 1023 is secured to the handle 1025 by means of locking members 1035. The functioning of the locking members 1035 will be further described below. The locking members 1035 allow for the threaded rods 1017, 1019, 1021, 1023 to move vertically along their axis to adjust a shape and curvature of the blade member 1015.

Figure 36:
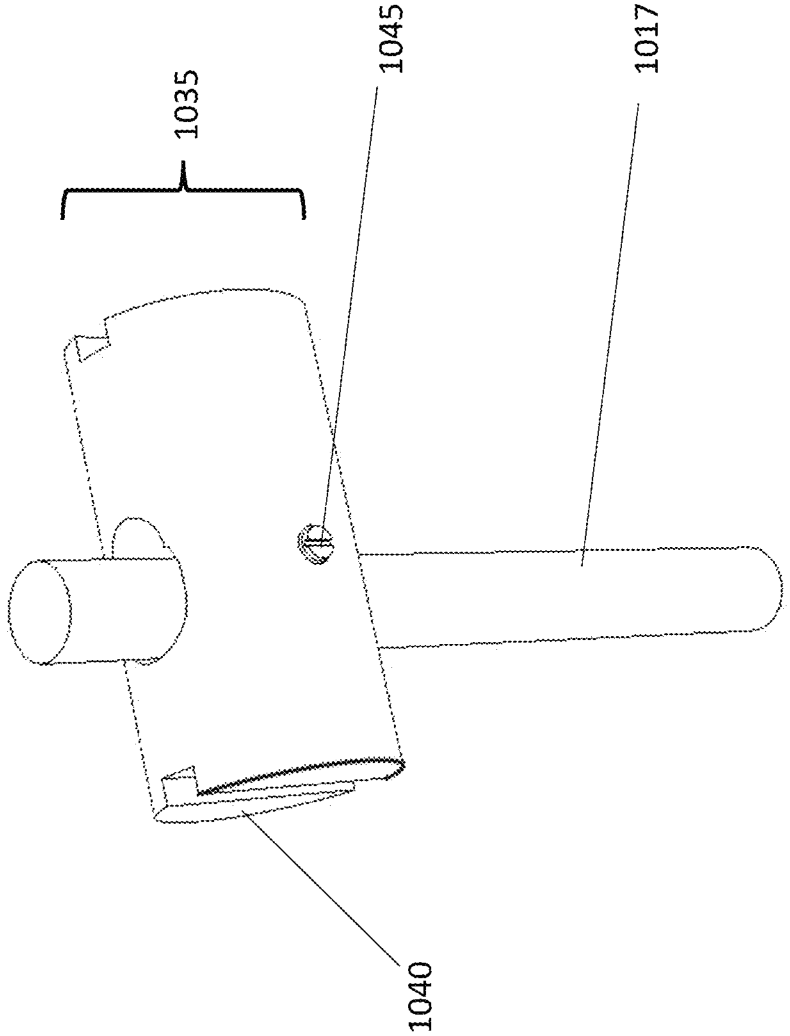
FIG. 36 is a perspective view of a locking member and a rod of the trowel, according to an embodiment of the present disclosure.
Figure 37A:
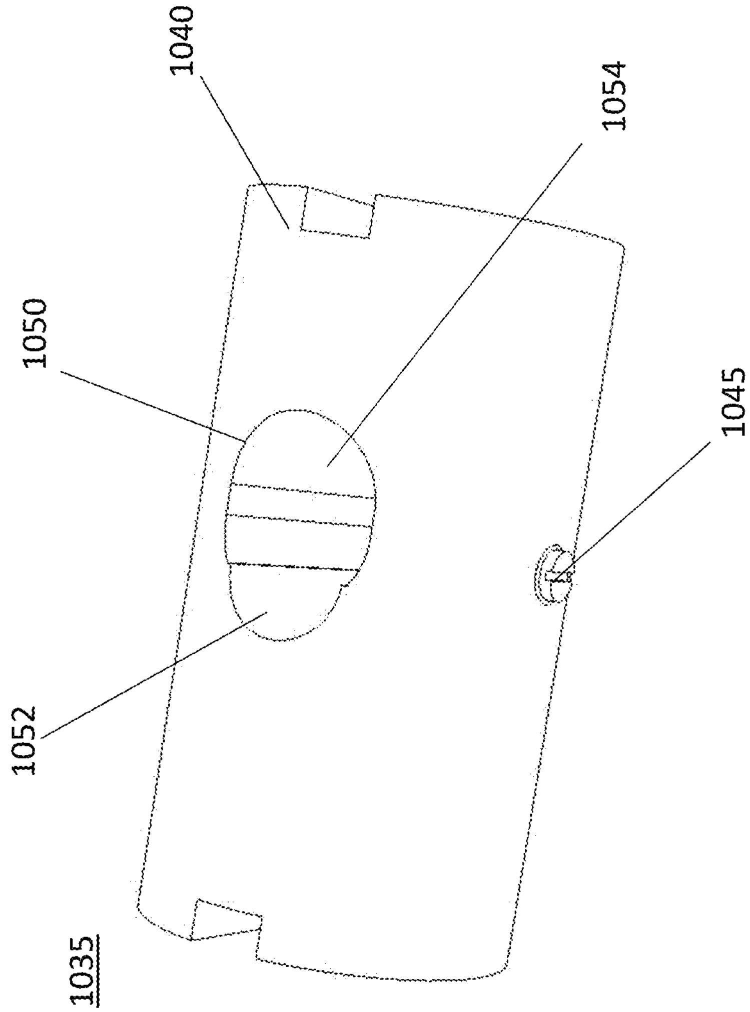
FIG. 37A is a perspective view of the locking member of the trowel, according to an embodiment of the present disclosure.
Figure 37B:
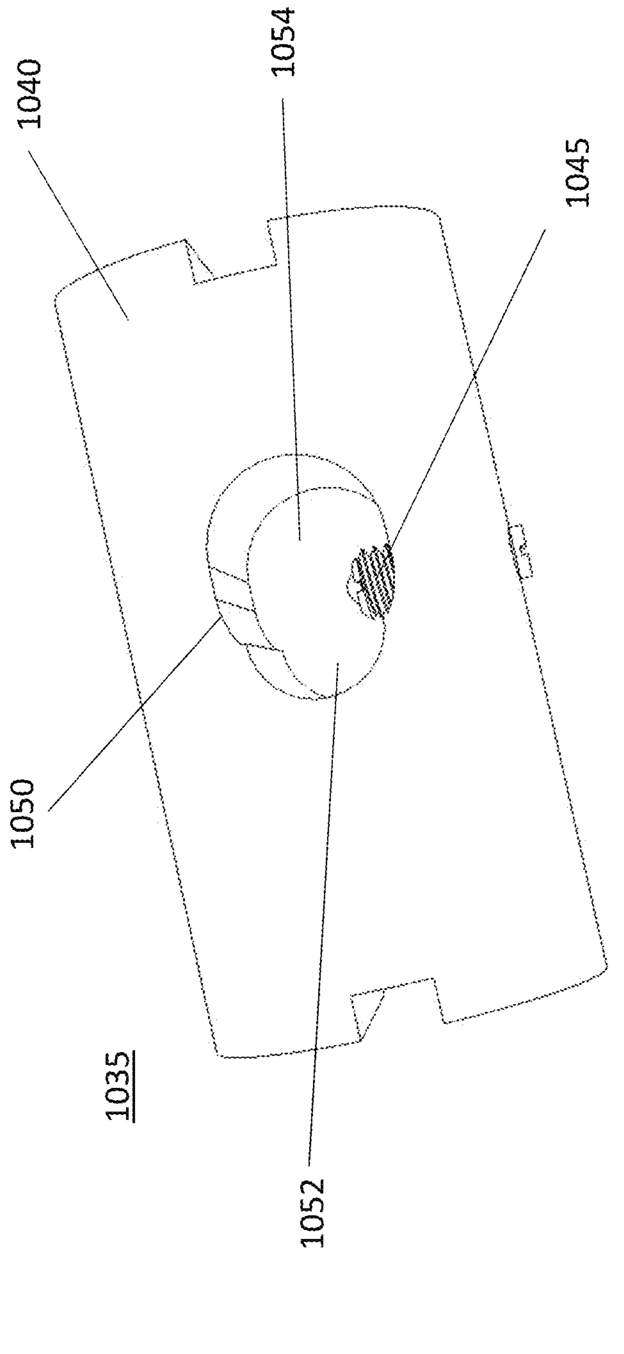
FIG. 37B is another perspective view of the locking member of the trowel, according to an embodiment of the present disclosure.
Figures 38A, 38B, 38C:
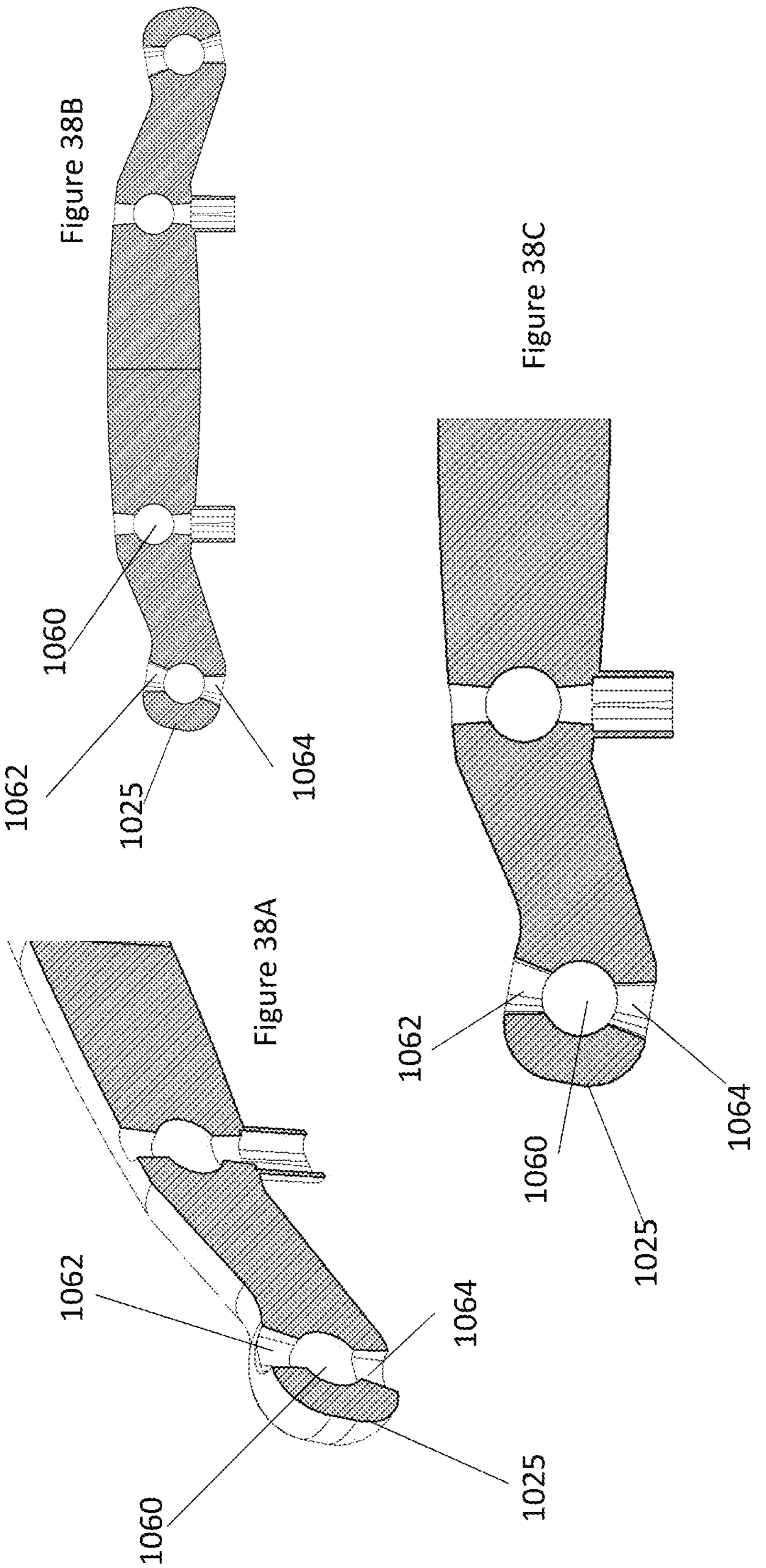
FIG. 38A is a partial perspective cross-sectional view of the handle of the trowel, according to an embodiment of the present disclosure.
FIG. 38B is a front cross-sectional view of the handle of the trowel, according to an embodiment of the present disclosure.
FIG. 38C is a partial front cross-sectional view of the handle of the trowel, according to an embodiment of the present disclosure.
Figure 39:
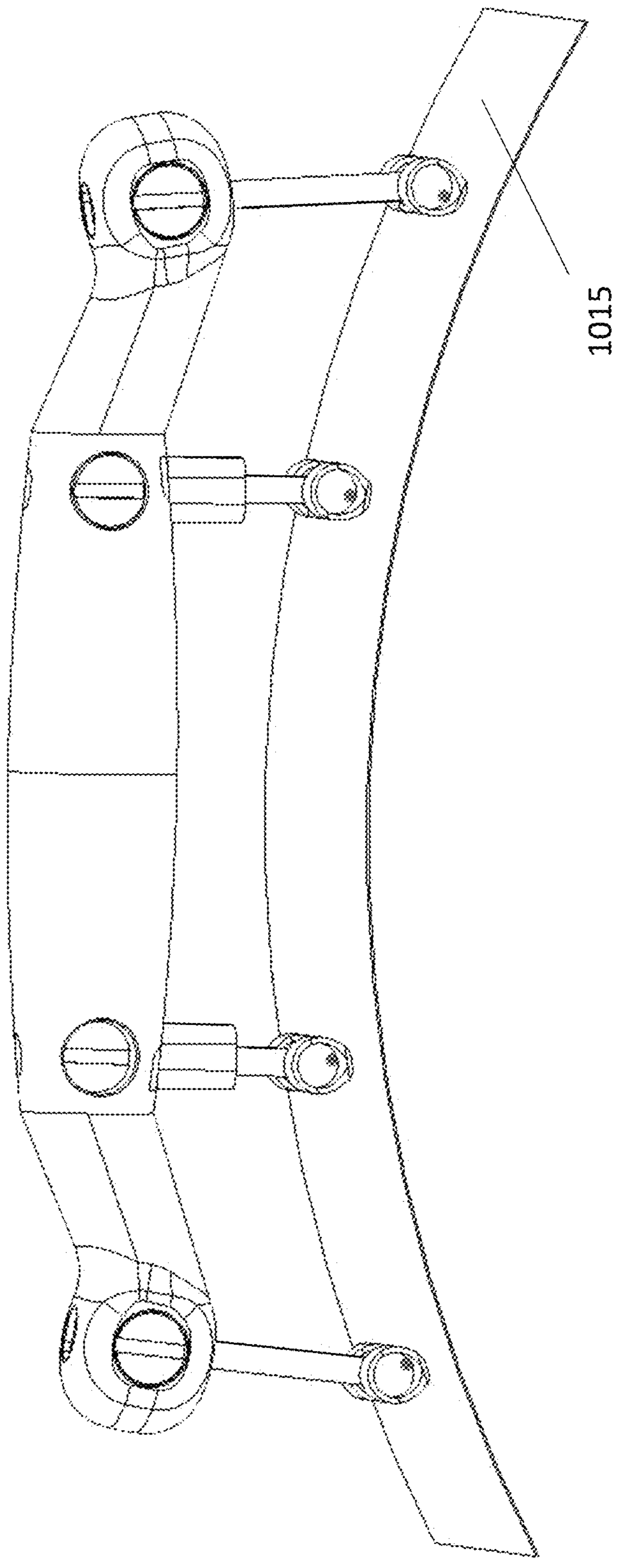
FIG. 39 is a front perspective view of an adjustable trowel with a curved blade member according to an embodiment of the present disclosure.
Figure 40:
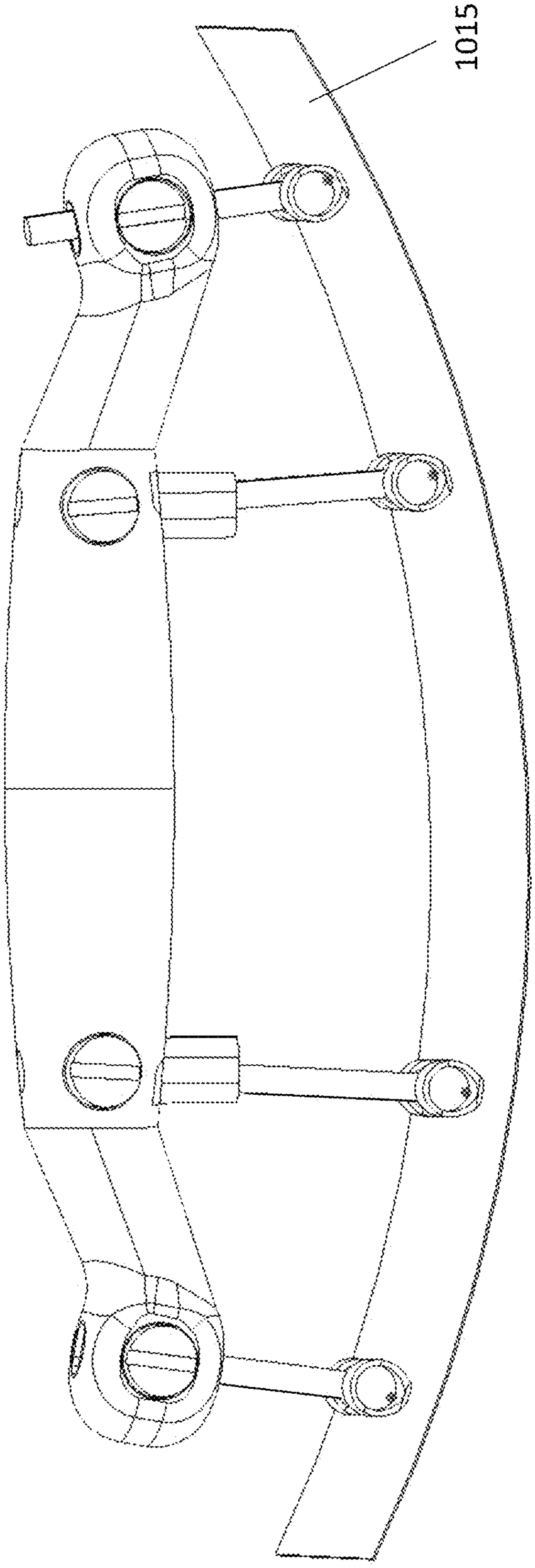
FIG. 40 is another front perspective view of an adjustable trowel with a curved blade member according to an embodiment of the present disclosure.
Figure 41:
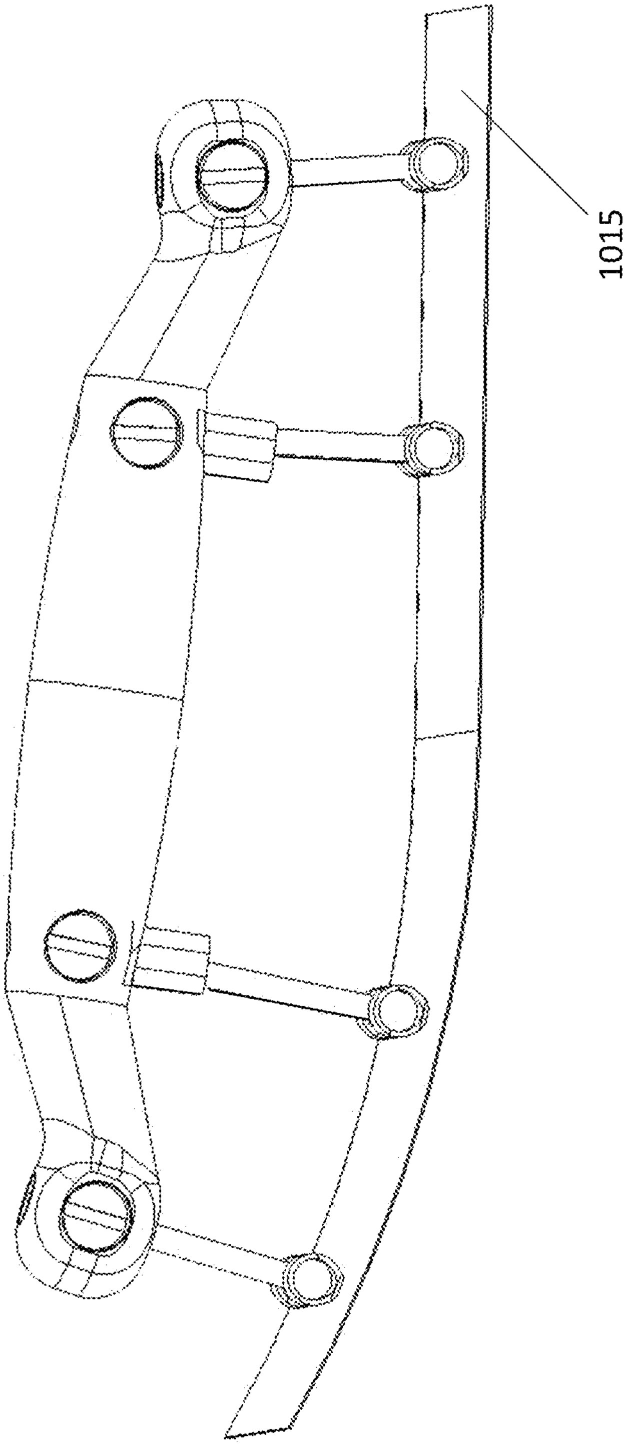
FIG. 41 is yet another front perspective view of an adjustable trowel with a curved blade member according to an embodiment of the present disclosure.
Figure 42:
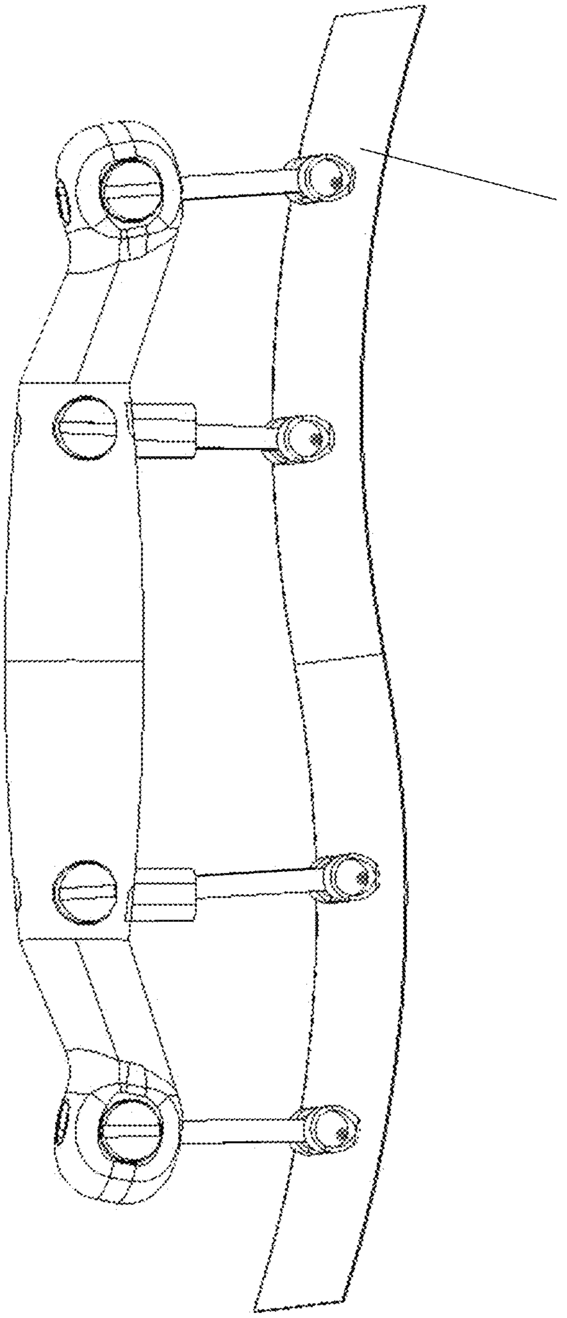
FIG. 42 is yet another front perspective view of an adjustable trowel with a curved blade member according to an embodiment of the present disclosure.

With reference to FIGS. 36, 37A and 37B and according to an embodiment of the present disclosure, the locking member 1035 is shown in greater detail, generally comprised of a pin 1040 and a ball spring plunger 1045. The locking members 1035 are positioned within a cavity (not shown) of the handle (not shown). The pin 1040 has a central aperture 1050, the central aperture 1050 separated into a threaded first half 1052 and a second half 1054. The threaded first half 1052 of the central aperture 1050 has a diameter equal to the diameter of the rod 1017, while the second half 1054 of the central aperture 1050 has a diameter that is larger than the diameter of the rod 1017. When the rod 1017 is positioned in the threaded first half 1052 of the central aperture 1050 of the pin 1040, the rod 1017 is in a locked position. Indeed, the ball spring plunger 1045 biases the rod 1017 in the first half of the central aperture 1050, and the threads of the rod 1017 are connected to the threads of the threaded first half 1052 of the central aperture 1050. When the pin 1040 is moved laterally by a user, within the handle (not shown), the rod 1017 overcomes the biasing force of the ball spring plunger 1045 and moves from the locked position in the first half of the central aperture 1050 to the unlocked position in the second half of the central aperture 1050. When in the unlocked position, the rod 1017 can be moved upwardly or downwardly, thereby changing the shape of the blade member 1015. Indeed, when a desired height of the rod 1017 is desired, the pin 1040 must be pushed back to its original, locked position in the first half 1052 of the central aperture 1050. An advantage of the trowel 1010 is that the blade member 1015 can be adjusted to create various shapes, including curved shapes that would not be possible with traditional trowels. A worker skilled in the art would appreciate that although a locking member 1035 comprised of a pin 1040 and plunger 1045 is shown and described, other locking members are possible. For example, a thumb nut could be present to screw in or out to adjust the height of the threaded rod 1017 relative to the blade member 1015. In another embodiment, another type of non-threaded rod could have small perforations positioned vertically thereon for mating with a corresponding pin. The pin could be inserted within any of the perforations to the desired height of the rod 1017 and thus the correspondingly desired curvature of the blade member 1015. In yet another embodiment, the rod 1017 could be solid rather than threaded, with a sleeve, nut or bolt jamming the rod 1017 against the handle (not shown). The sleeve, nut or bolt would push the rod 1017 when either a pressure is applied thereto or when the sleeve is tightened onto the rod 1017. This could be achieved by a leverage motion or a screwing motion, such as the mechanism on a magnetic indicator holder base.

With reference to FIGS. 34, 38A, 38B and 38C and according to an embodiment of the present disclosure, the cavities 1060 of the handle 1025 are shown in greater detail. The upper and lower ends 1062, 1064 of the cavities 1060 are generally frustoconically-shaped to provide a pivoting axis for the threaded rods 1017. Indeed, adjusting the trowel 1010 requires moving the locking member 1035 laterally along the length of the cavity 1060. Then, the blade member 1015 is raised or lowered to the desired location, which causes the rod 1017 to move upwardly and downwardly and pivot along the hinge 1030. The frustoconical shape of the upper and lower ends 1062, 1064 of the cavity 1060 allows the rod 1017 to pivot properly within the cavity 1060. A worker skilled in the art would appreciate that the cavities 1060 positioned on the outermost region of the handle 1025 will have the widest frustoconical shape as the rods 1017 will be subject to the most pivoting action. Cavities 1060 positioned progressively closer to the center of the handle 1025 will have narrower frustoconical shapes as the rods 1017 will be subject to less pivoting. A cavity 1060 positioned at the center of the handle 1025 will not require a frustoconical shape of the upper and lower ends 1062, 1064 of the cavity 1060 as the rod 1017 will not be able to pivot. In the present embodiment, it has been shown that the optimal angle in the two outermost cavities 1060 is ±15 degrees, and ±7 degrees for the innermost cavities 1060. However, these optimal angles could vary based on the desired positioning of the rods 1017, 1019, 1021, 1023 relative to the center of the blade member 1015.

With reference to FIGS. 39, 40, 41, 42 and 43, different shapes of the blade member 1015 are shown possible with the adjustable trowel 1010.

Figure 43:
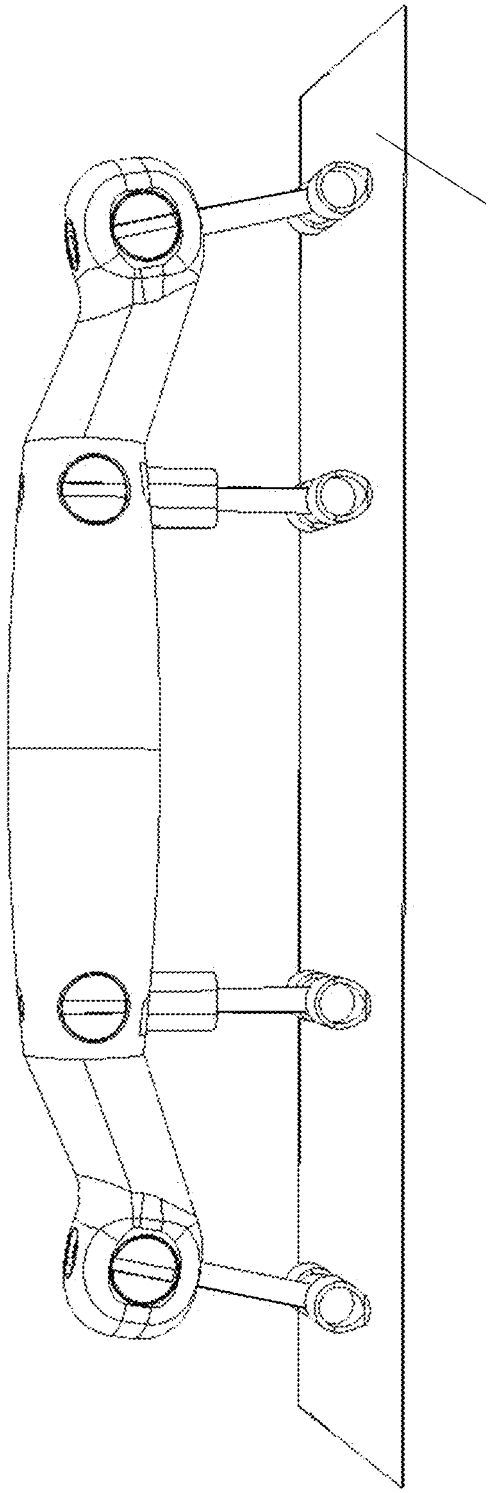
FIG. 43 is another front perspective view of an adjustable trowel with a straight blade member according to an embodiment of the present disclosure.
Figure 43A:
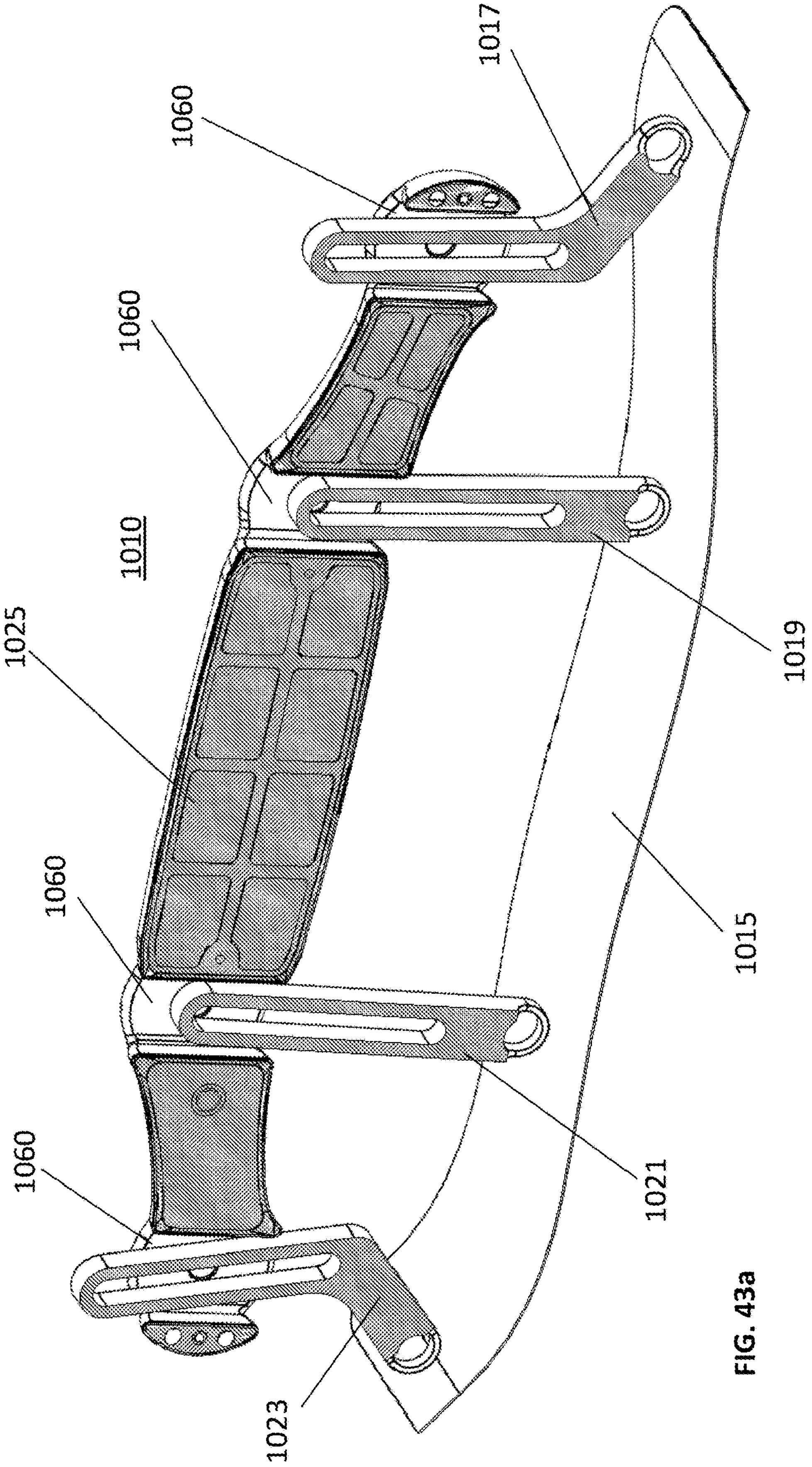
FIG. 43*a* is a perspective cross-sectional view of an adjustable trowel according to yet another embodiment of the present disclosure.
Figure 44:
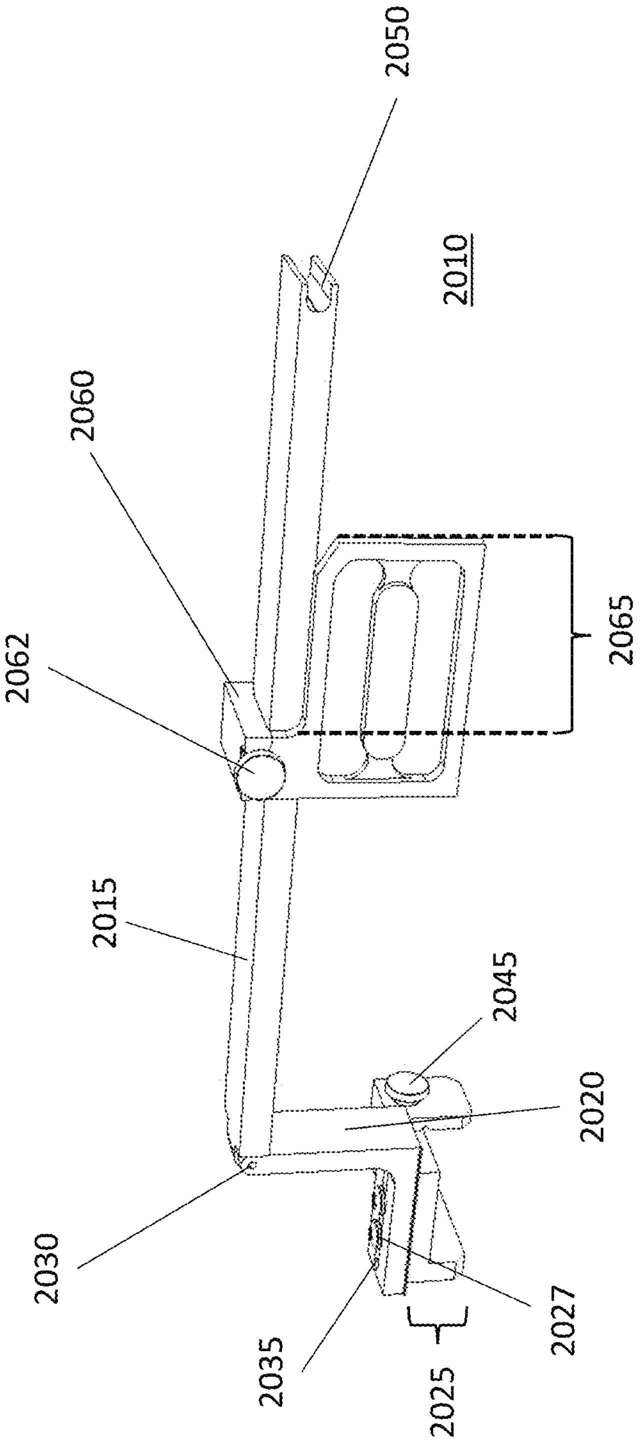
FIG. 44 is a perspective view of an adjustable stopper assembly according to an embodiment of the present disclosure.
Figure 45:
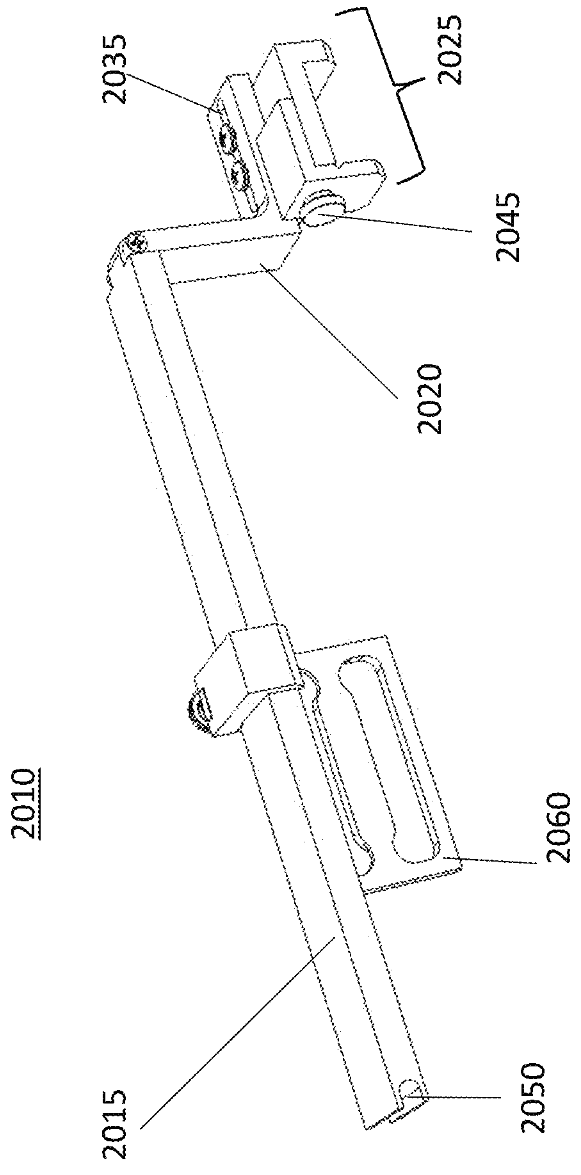
FIG. 45 is another perspective view of an adjustable stopper assembly according to an embodiment of the present disclosure.
Figure 46:
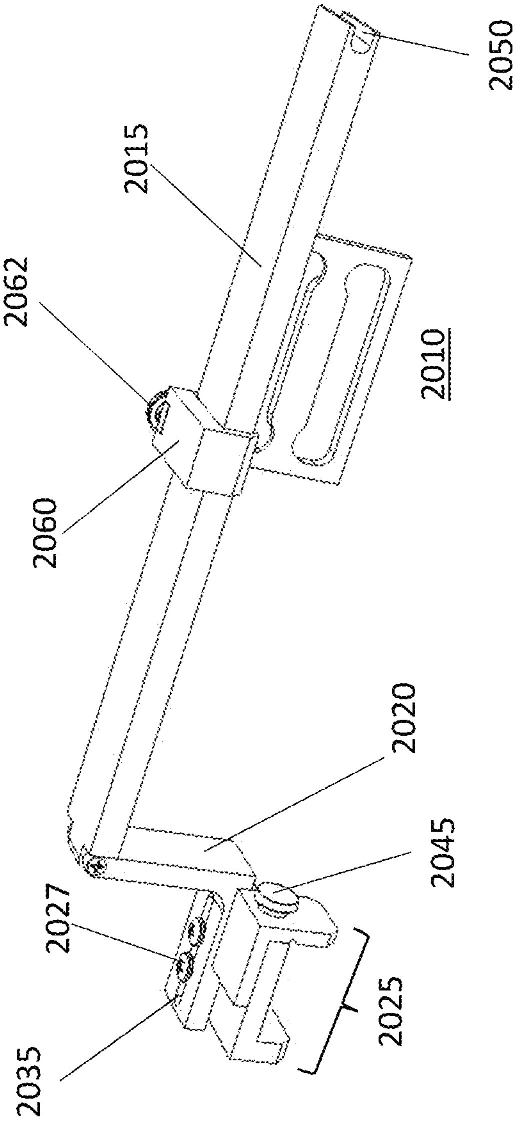
FIG. 46 is yet another perspective view of an adjustable stopper assembly according to an embodiment of the present disclosure.
Figure 47:
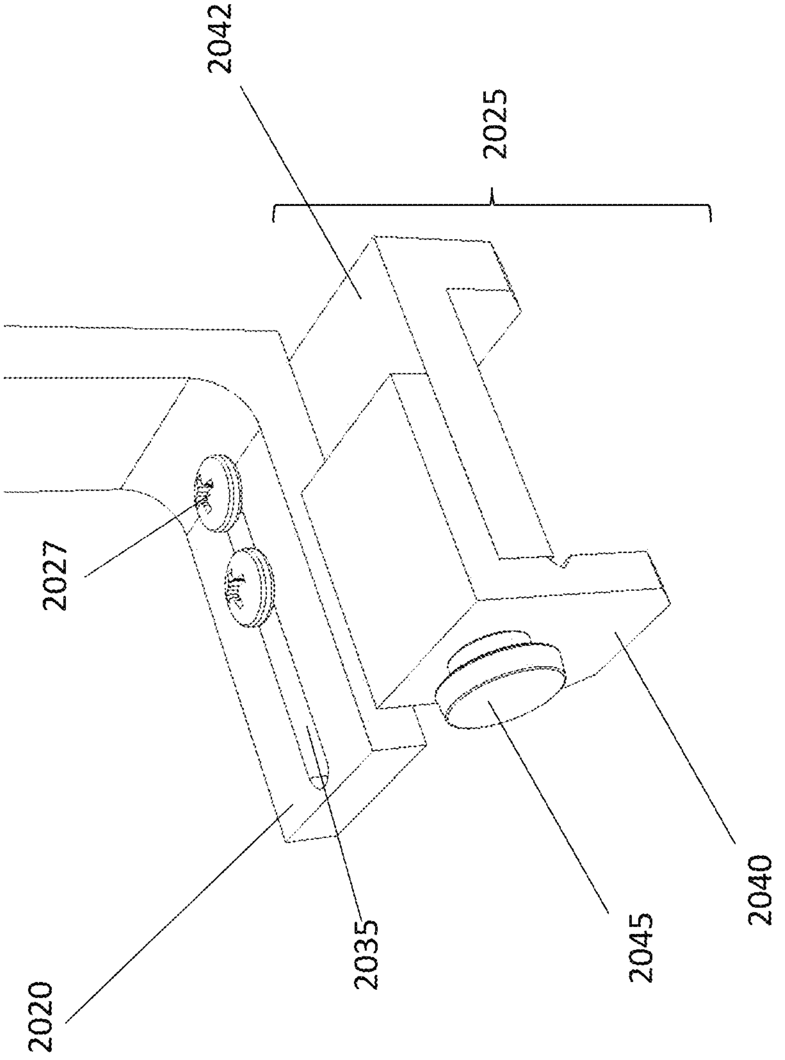
FIG. 47 is an enlarged perspective view of an L-bracket and connector portion of an adjustable stopper assembly according to an embodiment of the present disclosure.

With reference to FIG. 43*a*, an alternate embodiment of the adjustable trowel 1010 are shown, having four rods 1017, 1019, 1021, 1023. Locking members are provided, comprised of longitudinal slits in each of the rods 1017, 1019, 1021, 1023 through which it is possible to fasten a bolt or lock nut to secure the rods 1017, 1019, 1021, 1023 through the handle 1025. Cavities 1060 are also provided within the handle 1060, each cavity 1060 having upper and lower ends that are wide enough to provide sufficient pivoting of the rods 1017, 1019, 1021, 1023. Indeed, rod 1023 is specifically shown pivoted within the cavity 1060 to provide the desired curvature of the blade member 1015. As shown, the outer cavities 1060 are wider than the inner cavities 1060 to allow a greater pivot of the rods 1017, 1023 in relation to the rods 1019, 1021. The edges of the upper and lower ends of the cavities 1060 have a curvature to further facilitate such pivoting of the rods 1017, 1019, 1021, 1023.

With reference to FIGS. 34-43*a* and according to an embodiment of the present disclosure, an adjustable trowel is disclosed comprising a blade member to manipulate a material; at least two rods secured to the blade member to apply force onto the blade member; a handle connected to the at least two rods to move the blade member, the handle further comprised of at least two cavities; and, at least two locking members releasably secured to the at least two rods, the at least two locking members allowing the at least two rods to move vertically through the at least two locking members to adjust a shape and curvature of the blade member. The at least two rods may be threaded threaded. Each of the rods is secured to the blade members with a hinge, allowing each of the at least two rods to rotate about an axis of the hinge. The two locking members are comprised of a pin and a ball spring plunger. The pin has a central aperture separated into a threaded first half and a second half, the threaded first half having a diameter equal to the diameter of the at least two rods. The ball spring plunger biases the at least two rods in the threaded first half of the central aperture. The cavities have upper and lower ends, the upper and lower ends having a clearance to provide a pivoting range for the at least two rods. The edges of the upper and lower ends of the at least two cavities have a curvature to facilitate the pivoting range of the at least two rods.

With reference to FIGS. 44, 45, 46 and 47 and according to an embodiment of the present disclosure, an adjustable stopper assembly 2010 for use in press brakes (not shown) is shown generally comprised of an upper frame 2015, an L-bracket 2020 and a connector portion 2025. The upper frame 2015 is pivotally connected to the L-bracket 2020 by means of a pin 2030. A worker skilled in the art would appreciate that a rear wall of the upper frame 2015 abuts onto the L-bracket 2020 such that the upper frame 2015 can only pivot from 0 to 180 degrees. At both 0 and 180 degrees, the upper frame 2015 is in a right angle with the L-bracket 2020. The L-bracket 2020 is connected to the connector portion 2025 by screws 2027 screwed through a longitudinal aperture 2035 of the L-bracket 2020 and into pre-existing holes (not shown) of the connector portion 2025. The connector portion 2025 is further comprised of upper and lower segments 2040, 2042, the upper and lower segments 2040, 2042 connecting to the press brake (not shown). Indeed, the upper segment 2040 is further comprised of a thumb nut 2045, which is releasably secured to an aperture (not shown) in the lower segment 2042. Tightening of the thumb nut 2045 reduces the distance between opposing walls of the upper and lower segments 2040, 2042, thereby tightening the connector portion 2025 and thusly the adjustable stopper assembly 2010 to a rear portion of the press brake (not shown). To remove the adjustable stopper assembly 2010 from the press brake (not shown), the thumb nut 2045 is loosened, which separates opposing walls of the upper and lower segments 2040, 2042 and allows easy removal of the adjustable stopper assembly 2010. The adjustable stopper assembly 2010 is also secured to a front portion of the press brake (not shown) by a U-shaped front member 2050. Indeed, the front portion of the press brake (not shown) is positioned into the U-shaped front member 2050 to only permit lateral movement of the adjustable stopper assembly 2010 relative to the press brake. In other words, once the U-shaped front member 2050 has been secured into the front portion of the press brake (not shown), and the thumb nut 2045 has been tightened such that the connector portion 2025 is secured to the rear portion of the press brake (not shown), slight loosening of the thumb nut 2045 will only permit the adjustable stopper assembly 2010 to move laterally relative the press brake (not shown). The adjustable stopper assembly 2010 is also comprised of a stopping member 2060 that is releasably secured to the upper frame 2015. The stopping member 2060 is utilized to stop a layer of sheet metal (not shown) from advancing further into the press brake (not shown). The stopping member 2060 is removable by tightening and loosening a stopper thumb nut 2062, which allows the securing of the stopping member 2060 to the upper frame 2015. In an embodiment, the stopping member 2060 is separated into two pieces, and the stopper thumb nut 2062 screws a first piece into a second piece to prevent wear and tear of the screw of the stopper thumb nut 2062 on the upper frame 2015. As shown specifically between FIGS. 44 and 45, the stopping member 2060 is reversible, depending on the length as desired of the sheet metal. Indeed, the stopping member 2060 is further comprised of an adapter length 2065 that is approximately 3 inches in length, to be positioned under a front portion of the press brake (not shown) to provide custom metal sheet length that would otherwise not be possible with conventional stoppers or other press brake tools. Although not shown in the Figures, the upper frame 2015 may be further comprised of a measurement guide, or ruler, along the top length of the upper frame 2015. Therefore, when the stopping member 2060 is slid along the length of the upper frame 2015, an operator can quickly and easily determine the depth of the sheet metal that has been inserted within the press brake (not shown). A worker skilled in the art would appreciate that such a measurement guide could be optional, such that an operator of the stopper assembly 2010 could install the measurement guide once the stopper assembly 2010 has been properly positioned on the press brake (not shown).

Figure 48:
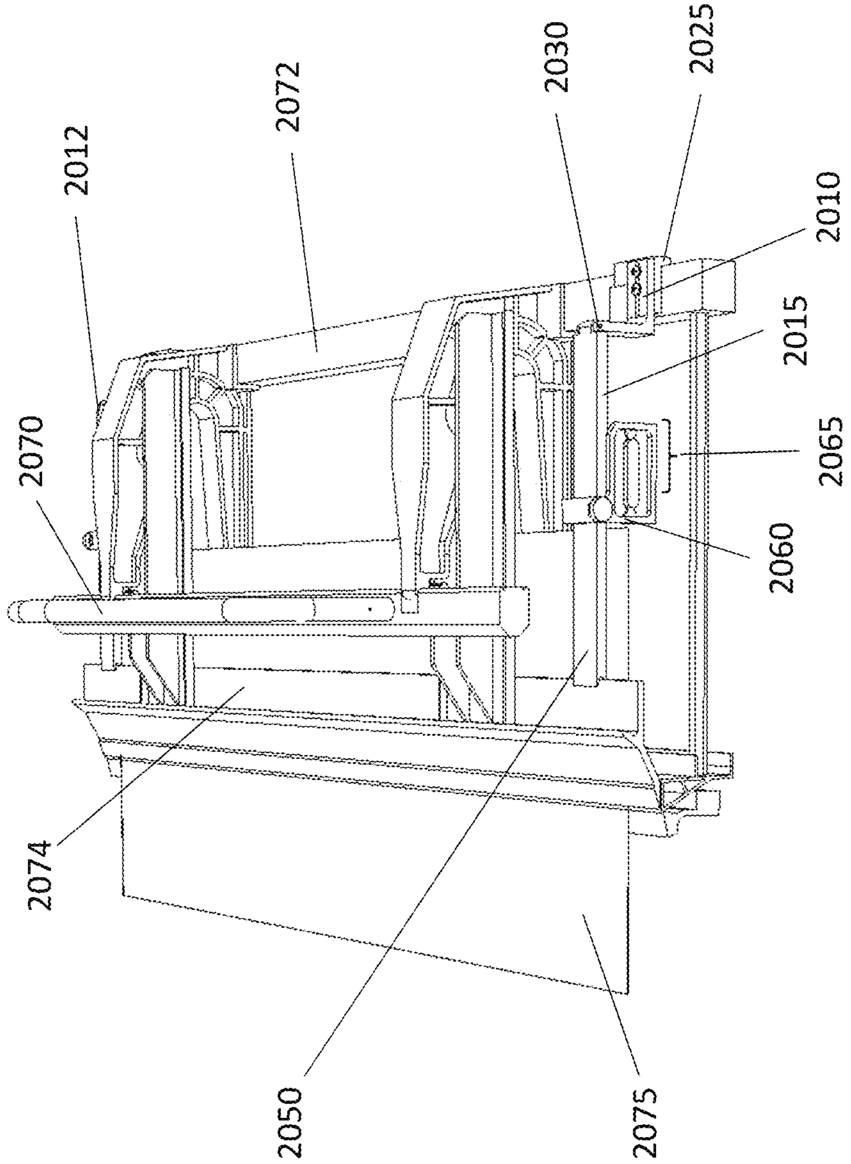
FIG. 48 is a perspective view of two adjustable stopper assemblies secured to a press brake according to an embodiment of the present disclosure.
Figure 49:
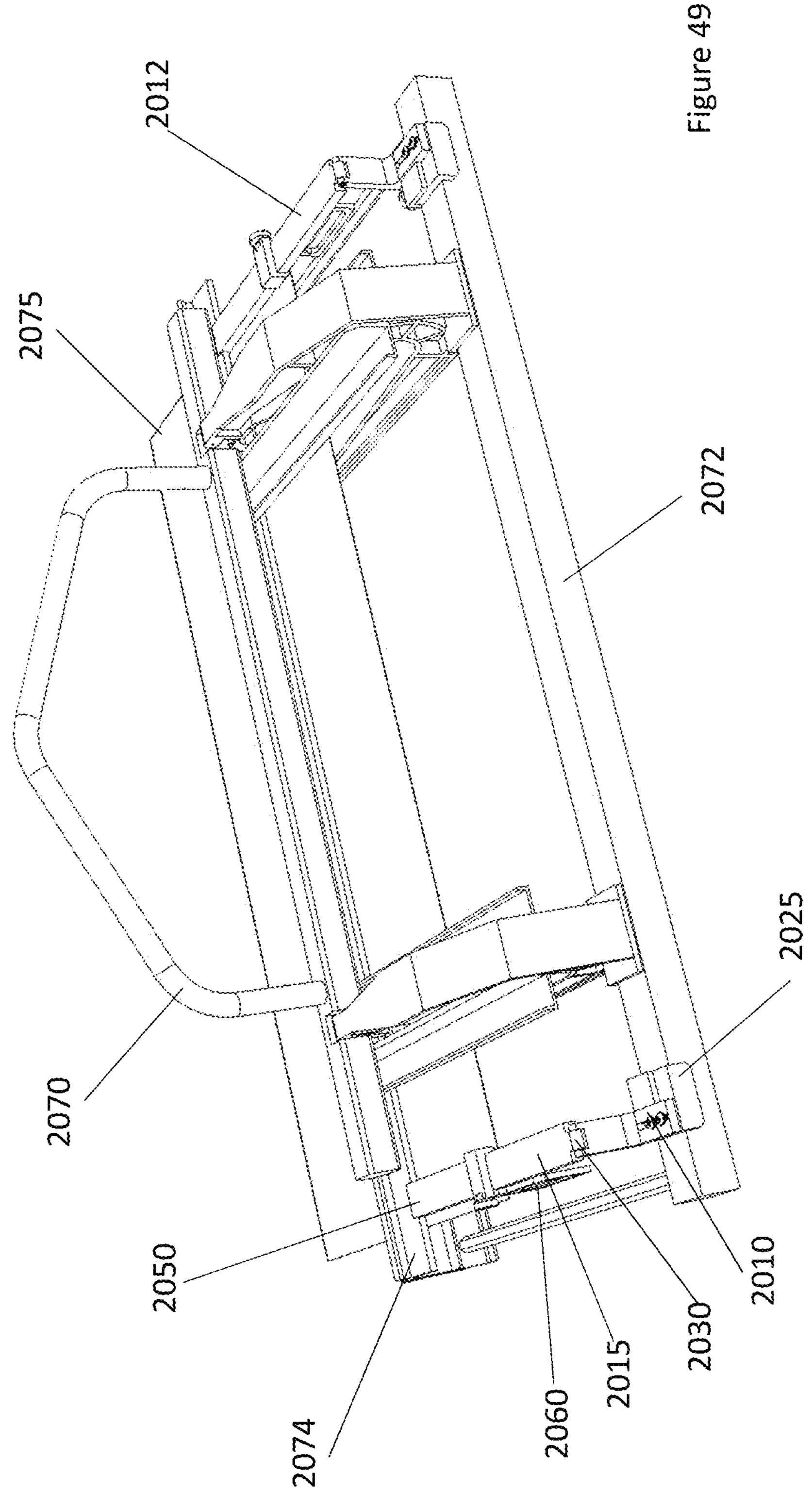
FIG. 49 is another perspective view of two adjustable stopper assemblies secured to a press brake according to an embodiment of the present disclosure.

With reference to FIGS. 48 and 49, two adjustable stopper assemblies 2010, 2012 are shown secured to the press brake 2070. More specifically, the adjustable connector portion 2025 is shown secured to the rear portion 2072 of the press brake 2070. Meanwhile, the U-shaped front member 2050 of the adjustable stopper assembly 2010 is shown secured to the front portion 2074, known as the Anvil, of the press brake 2070. The stopping member 2060 of the adjustable stopper assembly 2010 is shown abutting against the sheet metal 2075, and therefore preventing the sheet metal 2075 from advancing any further into the press brake 2070. If desired, the stopping member 2060 can be reversed to allow the adapter length 2065 to fit underneath the anvil 2074 of the press brake 2070, thereby providing reduced depth to bend or shape the sheet metal 2075 that would otherwise not have been possible with conventional press brake tools. A worker skilled in the art would appreciate that to provide additional variations of sheet metal 2075 lengths within the press brake 2070, the upper frame 2015 can be pivoted along pin 2030 and the adjustable stopper assembly 2010 can be flipped 180-degrees entirely, which would cause the adjustable stopper assembly 2010 to be shorter along the width of the press brake by the width of the connector portion 2025. In doing so, the stopping member 2060 would also need to be reversed to properly abut onto the sheet metal 2075. Further, allowing the adjustable stopper assemblies 2010, 2012 to be slidable along the length of the press brake allows a user using the adjustable stopper assemblies 2010, 2012 to maintain a desired depth of the sheet metal 2075 while moving from one end of the press brake to the other.

Figure 50:
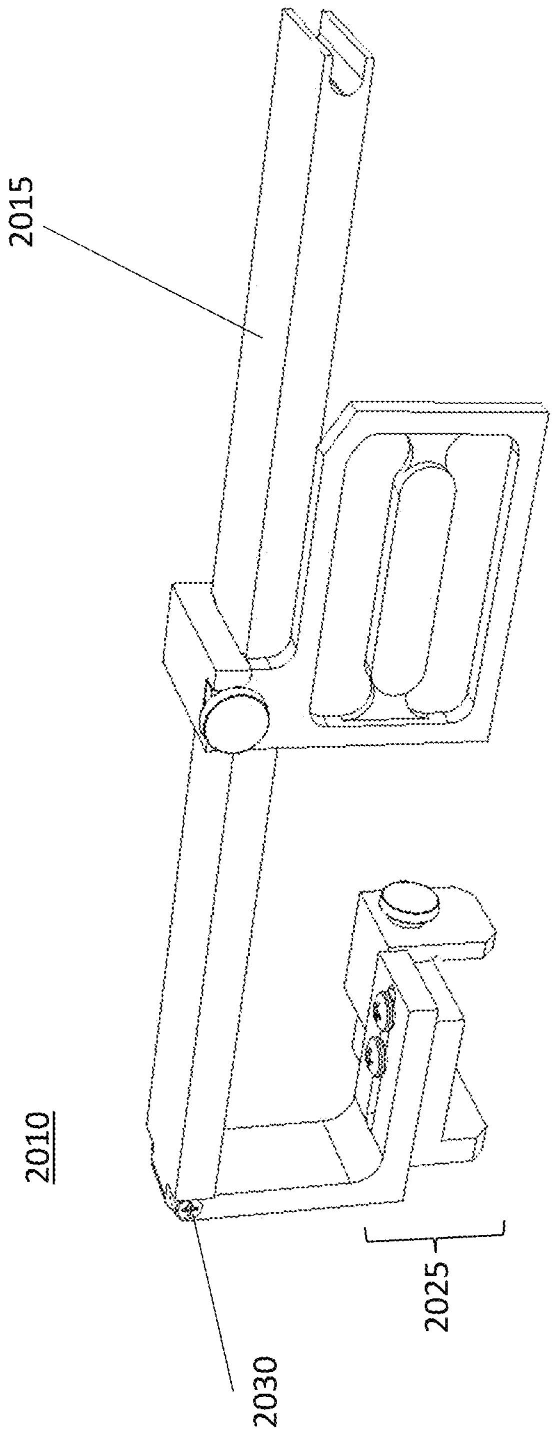
FIG. 50 is a perspective view of an adjustable stopper assembly in a reversed position according to an embodiment of the present disclosure.
Figure 51:
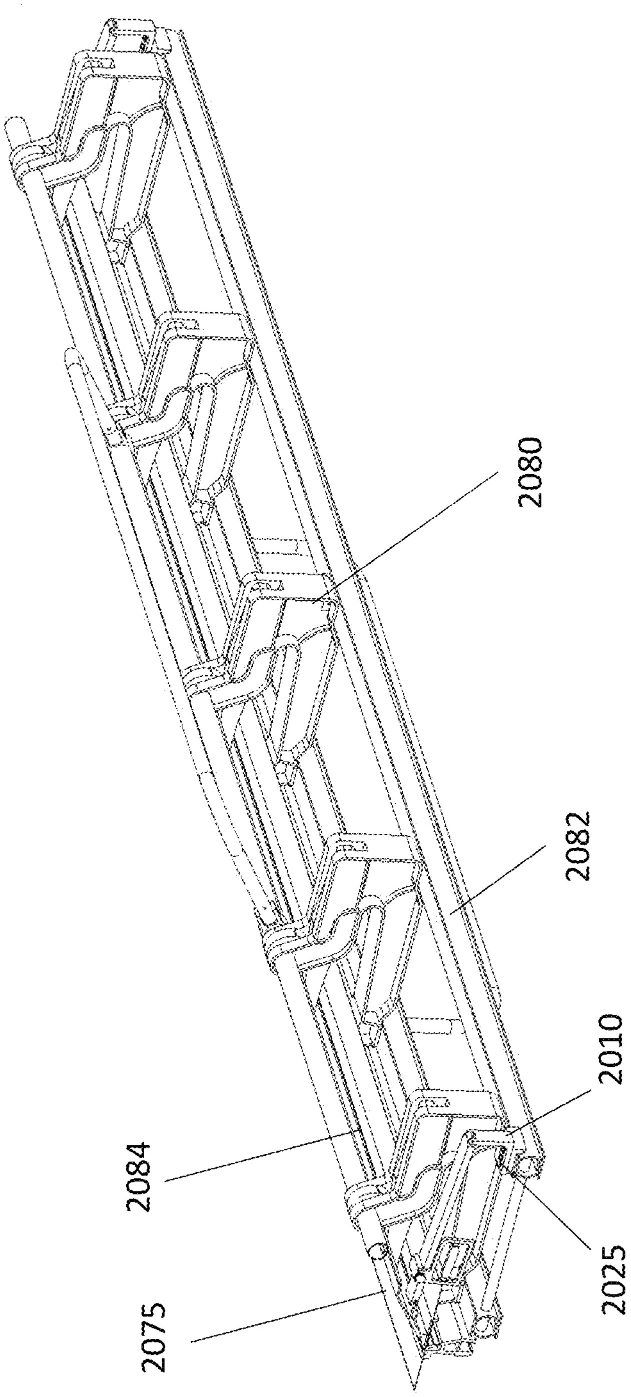
FIG. 51 is a perspective view of two adjustable stopper assemblies in a reversed position secured to a press brake according to an embodiment of the present disclosure; and, FIG. 52 is another perspective view of an adjustable stopper assembly in a reversed position secured to a press brake according to an embodiment of the present disclosure.
Figure 52:
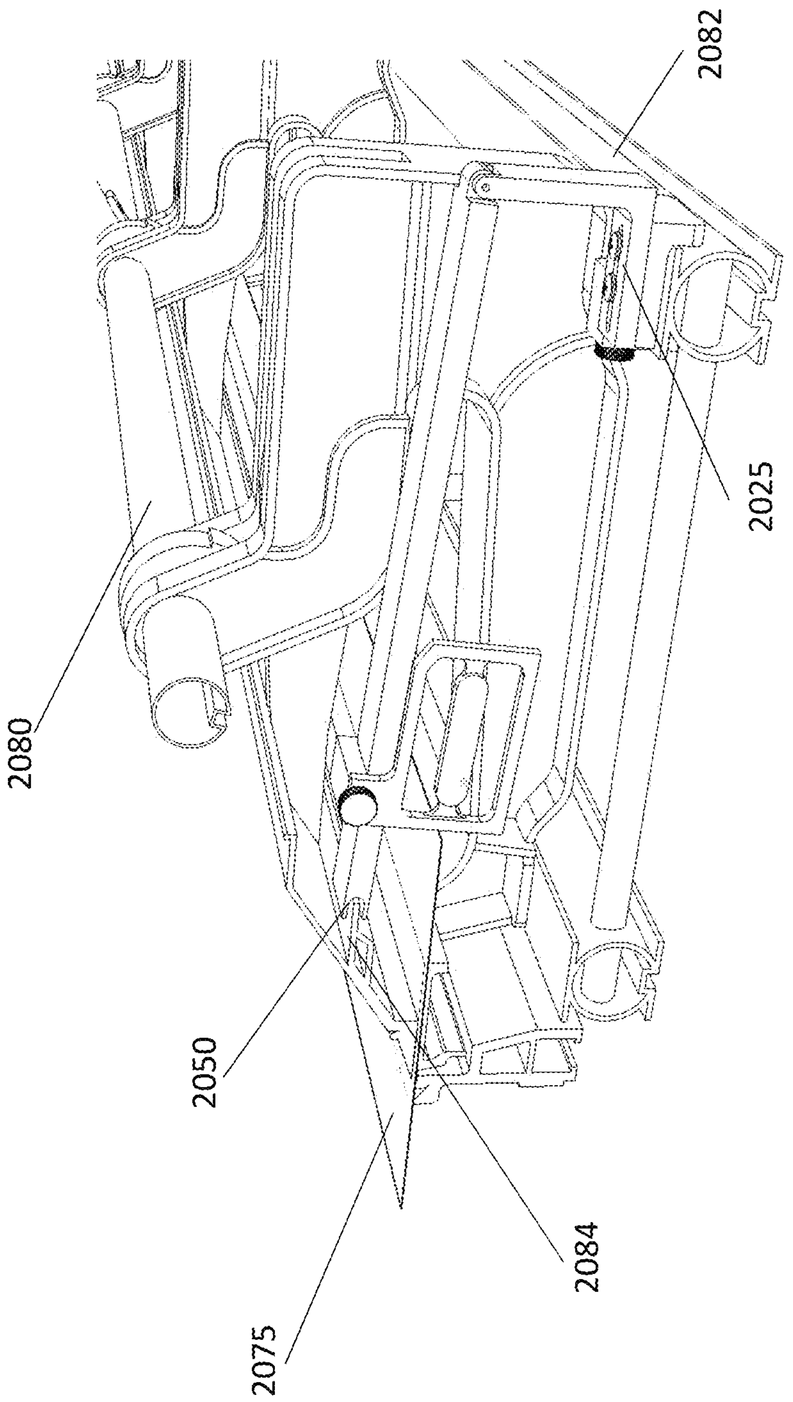

With reference to FIGS. 50, 51 and 52 and according to an embodiment of the disclosure, the adjustable stopper assembly 2010 is shown in a reversed position. As was outline above, in the reversible position the frame 2015 of the adjustable stopper assembly 2010 has been pivoted about pin 2030 by 180-degrees. By pivoting the upper frame 2015 by 180-degrees, the adjustable stopper assembly 2010 is able to be secured to another model of press brake 2080. As shown, the connector portion 2025 is still connected to a rear portion 2082 of the press brake 2080, while the U-shaped front member 2050 is secured to a front portion 2084 of the press brake 2080. The stopping member 2060 is still shown abutting and stopping the sheet metal 2075 from advancing further forward into the press brake 2080. Despite the fact that the distance between the rear and front portion 2082, 2084 of the press brake 2080 are shorter than the distance between the rear and front portions (not shown) of the above-mentioned press brake (2070 in FIGS. 48 and 49), the adjustable stopper assembly 2010 is simply re-adjusted to fit into a new configuration. As such, the adjustable stopper assembly 2010 is adaptable between a first configuration and a second configuration, which may be termed the original and reversed positions, respectively.

A person understanding this disclosure may now conceive of alternative structures and embodiments or variations of the above all of which are intended to fall within the scope of the disclosure as defined in the claims that follow.

The invention claimed is:

1. A container having an interchangeable liner comprising:

a bottom portion having at least one securing aperture for receiving the interchangeable liner;

at least one securing protrusion on the interchangeable liner for placement within the at least one securing aperture to lock the interchangeable liner within the container;

at least one stabilizing member positioned on an outer wall of the bottom portion for stabilizing the container when a substance is mixed within the container, the at least one stabilizing member having a locking protrusion; and, at least one locking aperture positioned on the bottom portion of the container;

wherein the removal of the interchangeable liner is facilitated through the interaction of the at least one securing aperture and the at least one securing protrusion;

wherein the at least one securing aperture prevents the interchangeable liner from moving within the container;

wherein the locking protrusion is further comprised of a first triangular lock and a second triangular lock;

and wherein the first triangular lock has a larger surface than the second triangular lock to enable a specific insertion of the at least one stabilizing member in the at least one locking aperture.

2. The container of claim 1 wherein the at least one stabilizing member is pivotable.

3. The container of claim 1 wherein the locking protrusion extends away from a top surface of the at least one stabilizing member.

4. The container of claim 3 wherein the top surface of the at least one stabilizing member clears a bottom surface of the container, allowing the at least one stabilizing member to laterally rotate inwardly underneath the bottom surface of the container.

5. The container of claim 1 further comprised of a plurality of ridges to connect to a handle of the container.

* * * * *